United States Patent
Ito et al.

(10) Patent No.: US 9,405,601 B2
(45) Date of Patent: Aug. 2, 2016

(54) IN-VEHICLE APPARATUS AND PROGRAM

(71) Applicants: Masuo Ito, Chiyoda-ku (JP); Isamu Kawakami, Chiyoda-ku (JP); Yoshiaki Katayama, Chiyoda-ku (JP)

(72) Inventors: Masuo Ito, Chiyoda-ku (JP); Isamu Kawakami, Chiyoda-ku (JP); Yoshiaki Katayama, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/419,016

(22) PCT Filed: Dec. 20, 2012

(86) PCT No.: PCT/JP2012/083034
§ 371 (c)(1),
(2) Date: Feb. 2, 2015

(87) PCT Pub. No.: WO2014/097442
PCT Pub. Date: Jun. 26, 2014

(65) Prior Publication Data
US 2015/0234690 A1    Aug. 20, 2015

(51) Int. Cl.
*G06F 13/00*    (2006.01)
*G06F 9/54*    (2006.01)
*G06F 13/42*    (2006.01)

(52) U.S. Cl.
CPC ............ *G06F 9/544* (2013.01); *G06F 13/4221* (2013.01)

(58) Field of Classification Search
CPC ....... G06F 9/4411; G06F 9/541; G06F 9/546; H04L 29/06
USPC .................................. 719/310, 313, 321, 328
See application file for complete search history.

(56) References Cited

U.S. PATENT DOCUMENTS

| | | | |
|---|---|---|---|
| 6,415,331 B1 * | 7/2002 | Ariga ...................... | H04L 29/06 709/238 |
| 8,649,939 B2 | 2/2014 | Yoshimura et al. | |
| 2010/0292867 A1 * | 11/2010 | Bohm ................... | B60W 50/06 701/1 |
| 2014/0075227 A1 * | 3/2014 | Shirota ................... | G06F 1/324 713/323 |

FOREIGN PATENT DOCUMENTS

| | | |
|---|---|---|
| JP | 2008 182650 | 8/2008 |
| JP | 2010 9326 | 1/2010 |

(Continued)

OTHER PUBLICATIONS

"Technical Overview", Autosar Technical Overview, V2.0.1, pp. 1-43, (Jul. 8, 2005).

(Continued)

*Primary Examiner* — Andy Ho
(74) *Attorney, Agent, or Firm* — Oblon, McClelland, Maier & Neustadt, L.L.P.

(57) ABSTRACT

An ASL is associated with an APP module having as a communication target an existing APP SW-C(1). A buffer part accumulates data to the existing APP SW-C(1) and data from the existing APP SW-C(1). A communication processing part transmits the data to the existing APP SW-C(1) accumulated in the buffer part to the existing APP SW-C(1), receives data transmitted from the existing APP SW-C(1), and stores the received data in the buffer part. An API processing part receives as input from the APP module data to the existing APP SW-C(1), stores the data received as input in the buffer part, receives as input from the buffer part data from the existing APP SW-C(1), and outputs the data received as input to the APP module.

16 Claims, 17 Drawing Sheets

(56) References Cited

FOREIGN PATENT DOCUMENTS

| | | |
|---|---|---|
| JP | 2011 2928 | 1/2011 |
| JP | 2011 38530 | 2/2011 |
| JP | 2011 170626 | 9/2011 |
| JP | 2012 128788 | 7/2012 |
| JP | 2012 155682 | 8/2012 |
| WO | 2012 039216 | 3/2012 |

OTHER PUBLICATIONS

International Search Report Issued Jan. 29, 2013 in PCT/JP12/083034 Filed Dec. 20, 2012.

* cited by examiner

IN-VEHICLE APPARATUS AND PROGRAM

TECHNICAL FIELD

The present invention relates to an in-vehicle apparatus to be installed in an automobile.

BACKGROUND ART

AUTOSAR (registered trademark) (AUTomotive Open System ARchitecture), which is a software standard platform in the automobile field, provides software layering with an architecture in which an application layer is implemented as a software component and a lower layer of the software component (hereinafter also referred to as an SW-C) is implemented as a VFB (Virtual Functional Bus).

The VFB provides an environment in which SW-Cs are freed from hardware and network considerations.

Once the interface for the SW-Cs is determined, a software developer designs how the VFB interconnects the SW-Cs and implements the SW-Cs according to the design.

In this way, the VFB can enhance the portability of the SW-Cs.

CITATION LIST

Non-Patent Literature

Non-Patent Literature 1: AUTOSAR (registered trademark) Technical Overview V2.0.1

SUMMARY OF INVENTION

Technical Problem

Conventionally, the updating of software due to addition of an SW-C requires changing of the VFB, and it is thus necessary to redesign the VFB each time an SW-C is to be added.

For this reason, there is a problem, which is that the need to redesign the VFB for each additional SWC increases the number of man-hours for development.

In addition, the designing of the VFB requires a design tool. Further, to design the VFB appropriately using the design tool, full knowledge of how to design the VFB and how to operate the design tool is required.

Therefore, it is difficult to perform a software update to add an SW-C in a plug-and-play fashion to an in-vehicle apparatus after being moved away from the development environment.

The present invention has been conceived in view of the above-described circumstances, and primarily aims to allow addition of an application program without changing the VFB.

Solution to Problem

An in-vehicle apparatus according to the present invention, on which a plurality of software components are implemented, includes a data control part that is associated with an application program having as a communication target a software component out of the plurality of software components, the data control part including a buffer part that accumulates data to a communication target software component and data from the communication target software component, the communication target software component being the software component which is the communication target of the application program;

a communication processing part that transmits the data to the communication target software component accumulated in the buffer part to the communication target software component, receives data transmitted from the communication target software component, and stores the data received in the buffer part; and a data relay part that receives as input the data to the communication target software component, stores the data received as input in the buffer part, receives as input from the buffer part the data from the communication target software component, and outputs the data received as input.

Advantageous Effects of Invention

According to the present invention, a data control part that is able to communicate with a communication target software component is provided between an application program and the communication target software component, thereby allowing addition of the application program without changing the VFB.

DESCRIPTION OF EMBODIMENTS

First Embodiment

This embodiment describes a software platform that allows addition of an application program without changing a VFB.

Figure 1:
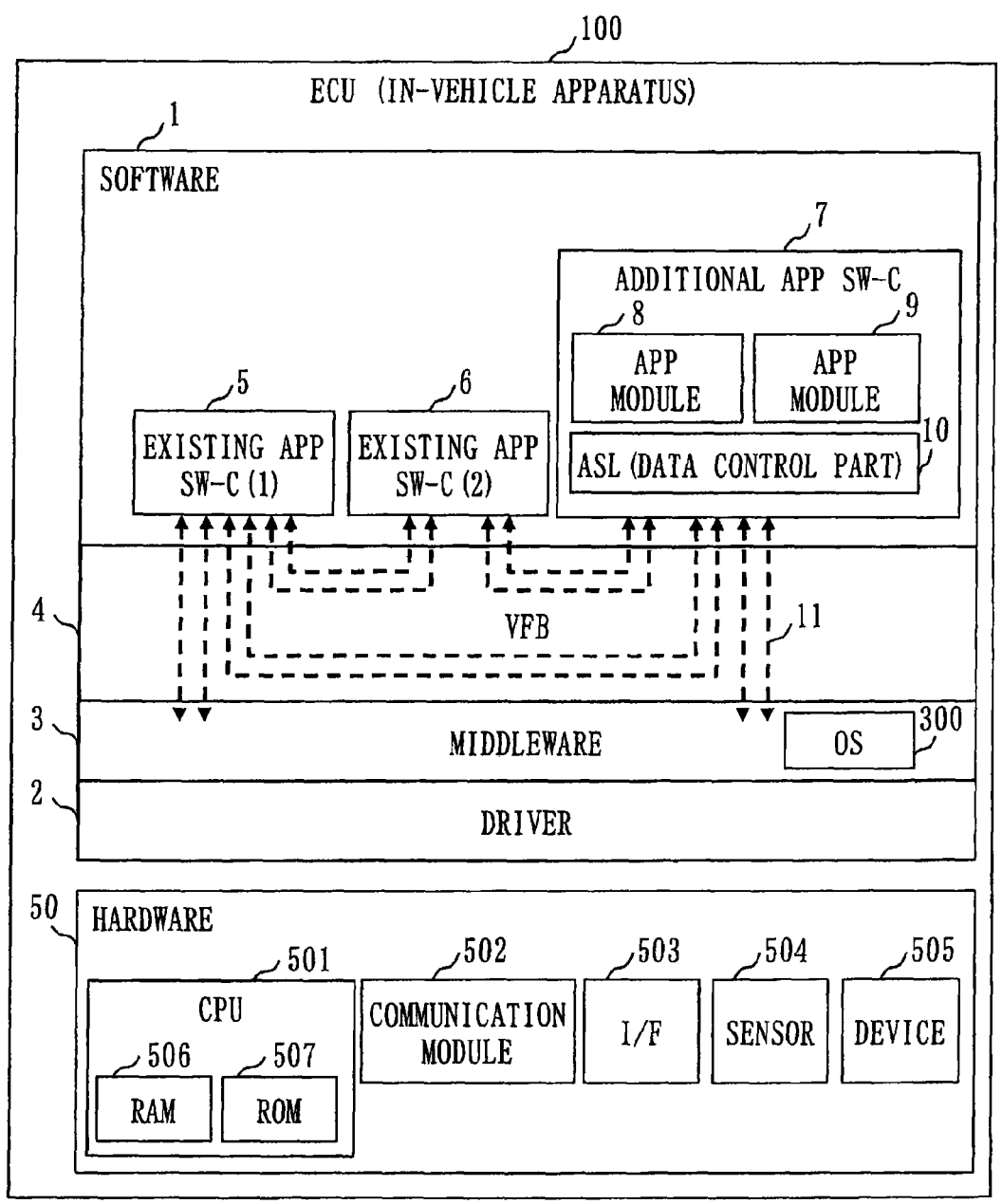
FIG. 1 is a diagram illustrating an example of a configuration of an ECU according to a first embodiment.

FIG. 1 illustrates an example of a configuration of an ECU (Electronic Control Unit) 100 according to this embodiment.

The ECU 100 corresponds to an example of an in-vehicle apparatus.

In FIG. 1, the configuration of the ECU 100 is illustrated as divided into hardware 50 and software 1.

The hardware 50 includes, for example, a CPU (Central Processing Unit) 501, a communication module 502, an interface 503, a sensor 504, and a device 505.

The CPU 501 includes a RAM (Random Access Memory) 506 and a ROM (Read Only Memory) 507.

The ROM 507 stores various programs constituting the software 1. These programs are loaded into the RAM 506, and are sequentially read into the CPU 501. The CPU 501 executes these programs.

The content of a process of each component in the software 1 to be presented in this and following embodiments is realized by execution of a program by the CPU 501.

In the description of this and following embodiments, information, data, signal values, and variable values indicating results of processes described as "evaluating - - - ", "determining - - - ", "extracting - - - ", "storing - - - ", "accumulating - - - ", "setting - - - ", "updating - - - ", "selecting - - - ", "calculating - - - ", "writing - - - ", "reading - - - ", "generating - - - ", "inputting - - - ", "outputting - - - ", "receiving - - - ", and so on are stored as files in the RAM 506.

The communication module 502 communicates with equipment inside and equipment outside a vehicle in which the ECU 100 is installed.

The interface 503 accepts various types of requests from users (a driver and a passenger) of the vehicle in which the ECU 100 is installed, and displays various types of information to the users.

The sensor 504 and the device 505 detect various events concerning the vehicle.

The interface 503, the sensor 504, and the device 505 may be placed inside the ECU 100 or may be placed outside the ECU 100.

When the interface 503, the sensor 504, and the device 505 are placed outside the ECU 100, the interface 503, the sensor 504, and the device 505 are connected to the CPU 501 with a bus.

The configuration of the hardware 50 illustrated in FIG. 1 is an example. The hardware 50 of the ECU 100 is not limited to the configuration of FIG. 1 and may be configured differently.

The software 1 consists of a driver 2, middleware 3, an OS (Operating System) 300, a VFB 4, an existing application SW-C(1) 5, an existing application SW-C(2) 6, and an additional application SW-C 7.

In FIG. 1, for the sake of convenience, the existing application SW-C(1) 5, the existing application SW-C(2) 6, and the additional application SW-C 7 are included. However, any number and types of SW-Cs may be included.

That is, an SW-C other than the existing application SW-C(1) 5, the existing application SW-C(2) 6, and the additional application SW-C 7 may be implemented on the ECU 100.

In the following, the existing application SW-C(1) 5, the existing application SW-C(2) 6, and the additional application SW-C 7 will also be described as the existing APP SW-C(1) 5, the existing APP SW-C(2) 6, and the additional APP SW-C 7, respectively.

Communication buses 11 indicated by dashed lines in the VFB 4 are virtual communication channels between an SWC and an SWC and between an SWC and the middleware.

The VFB 4 controls the content of data exchanged between an SW-C and an SW-C and between an SW-C and the middleware and controls execution timing.

Generally, the communication buses 11 are designed on a VFB design tool. In accordance with design details, program code is generated by an automatic code generation function of the VFB design tool.

That is, the VFB 4 consisting of the communication buses 11 is actually implemented as program code, like the driver 2, the middleware 3, the existing APP SW-C(1) 5, the existing APP SW-C(2) 6, and the additional APP SW-C 7.

At the time when an executable file of the VFB 4 to be implemented on the ECU 100 is generated, all of the driver 2, the middleware 3, the VFB 4, and the existing APP SW-C(1) 5 and the existing APP SW-C(2) 6 that function as applications, and an ASL (Application Sub Layer) 10 in the additional APP SW-C 7 are required.

Since the VFB 4 has the above-described properties, once the VFB 4 has been designed with only the existing APP SW-C(1) 5 and program code has been generated, adding the existing APP SW-C(2) 6 to the ECU 100 requires changing of the communication buses 11.

For this reason, in order to add the existing APP SW-C(2) 6 to the ECU 100 after the program code of the VFB 4 has been generated, it is necessary to redesign the VFB 4 and regenerate the program code.

The additional APP SW-C 7 consists of an application module 8, an application module 9, and the ASL 10.

The application modules 8 and 9 are application programs having as communication targets the existing APP SW-C(1) 5 and the existing APP SW-C(2) 6.

In FIG. 1, two application modules are illustrated for the sake of convenience. However, any number of application modules may be included.

The application modules 8 and 9 will also be described as the APP modules 8 and 9.

In the additional APP SW-C 7, the relation between the APP modules 8 and 9 and the ASL 10 is such that the ASL 10 constitutes a lower layer, while the APP modules 8 and 9 constitute an upper layer.

That is, the ASL 10 is associated with the APP modules 8 and 9 having as communication targets the existing APP SW-C(1) 5 and the existing APP SW-C(2) 6.

The existing APP SW-C(1) 5 and the existing APP SW-C(2) 6 each correspond to an example of a communication target software component.

The ASL 10 corresponds to an example of a data control part.

Although not illustrated, each of the existing APP SW-C(1) 5 and the existing APP SW-C(2) 6 also includes one or more APP modules.

However, each of the existing APP SW-C(1) 5 and the existing APP SW-C(2) 6 does not include a lower layer corresponding to the ASL 10.

The existing APP SW-C(1) 5 and the existing APP SW-C (2) 6 are described as "existing" because they are SW-Cs that already exist in the design phase of the VFB 4.

On the other hand, the additional APP SW-C 7 is described as "additional", because only the ASL 10 needs to exist in the design phase of the VFB 4 and the APP modules 8 and 9 may be added after the designing of the VFB 4 has been completed.

Figure 2:
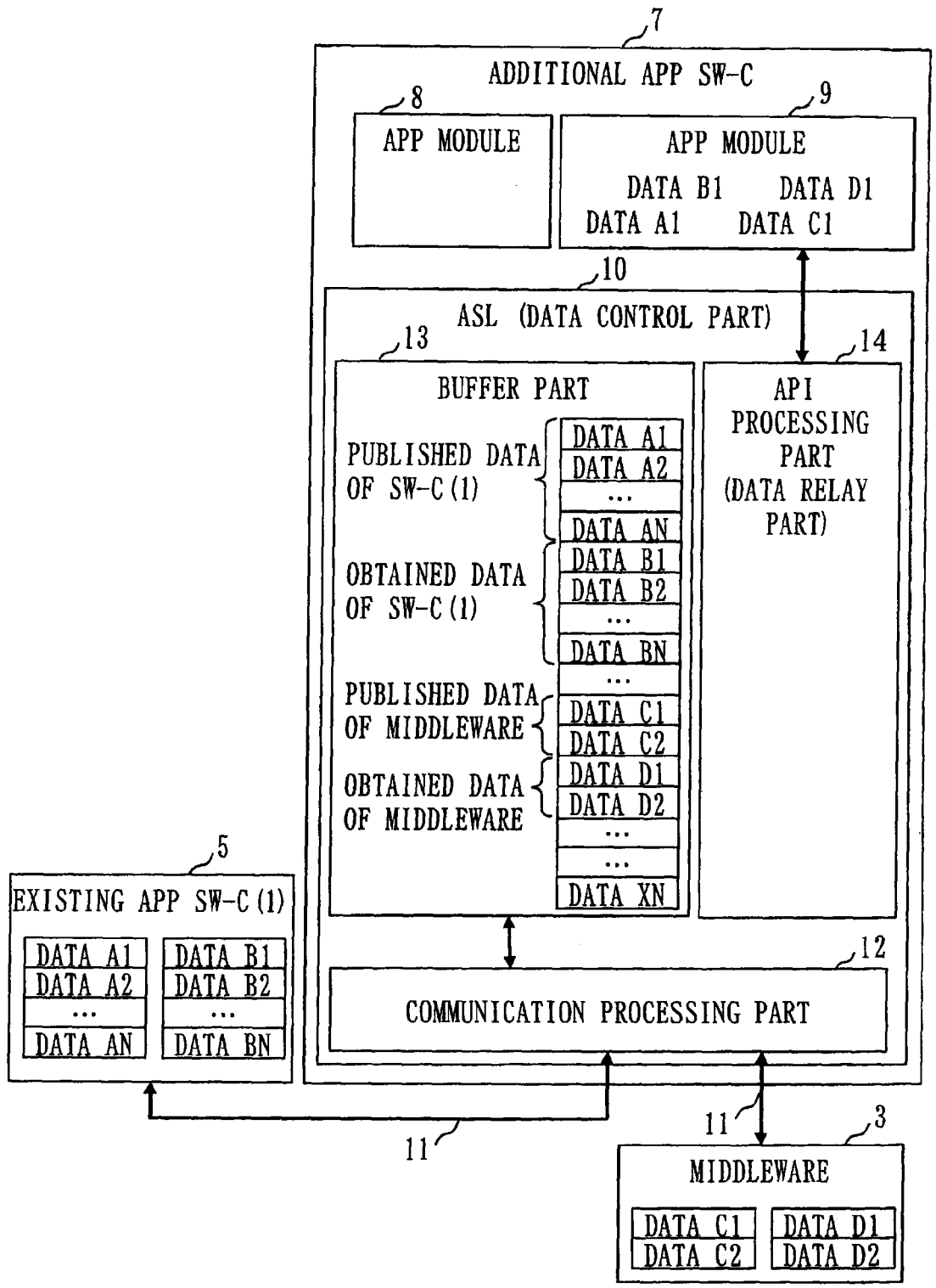
FIG. 2 is a diagram illustrating a configuration of an ASL in an additional application SW-C according to the first embodiment.

FIG. 2 illustrates details of the ASL 10 in the additional APP SW-C 7.

As illustrated in FIG. 2, the ASL 10 consists of a communication processing part 12, a buffer part 13, and an API (Application Program Interface) processing part 14.

The following description will be mainly directed to operation in which the ASL 10 intermediates communication between the APP module 9 and the existing APP SW-C(1) 5 and intermediates communication between the APP module 9 and the middleware 3.

For operation in which the ASL 10 intermediates communication between the APP module 8 and the existing APP SW-C(2) 6 and intermediates communication between the APP module 8 and the middleware 3, the following description should be read by replacing the APP module 9 with the APP module 8 and replacing the existing APP SW-C(1) 5 with the existing APP SW-C(2) 6.

As described above, the APP module 8 and the APP module 9 can be implemented on the ECU 100 after the ASL 10 has been implemented on the ECU 100.

The buffer part 13 accumulates data from the existing APP SW-C(1) 5 (published data of the SW-C(1)) and data to the existing APP SW-C(1) 5 (obtained data of the SW-C(1)).

The buffer part 13 also accumulates data from the middleware 3 (published data of the middleware) and data to the middleware 3 (obtained data of the middleware).

In FIG. 2 and the following description, for the sake of convenience, an example is illustrated where the published data of the SW-C(1), the obtained data of the SW-C(1), the published data of the middleware, and the obtained data of the middleware are stored in the buffer part 13. Physically, the published data of the SW-C(1), the obtained data of the SW-C(1), the published data of the middleware, and the obtained data of the middleware are stored in a buffer area which is a storage area in the RAM 506.

More precisely, the buffer part 13 manages writing to the buffer area and reading from the buffer area of the published data of the SW-C(1), the obtained data of the SW-C(1), the published data of the middleware, and the obtained data of the middleware.

The communication processing part 12 communicates with the existing APP SW-C(1) 5 and the middleware 3 through the VFB 4.

The communication bus 11 for communication between the APP module 9 and the existing APP SW-C(1) 5 is set in the VFB 4, and the communication processing part 12 is logically connected with this communication bus 11.

Using this communication bus 11, the communication processing part 12 receives data transmitted from the existing APP SW-C(1) 5, and stores the received data in the buffer part 13.

The communication processing part 12 also receives as input from the buffer part 13 data to the existing APP SW-C(1) 5, and transmits the data received as input to the existing APP SW-C(1) 5 using the communication bus 11 in the VFB 4.

Similarly, the communication bus 11 for communication between the APP module 9 and the middleware 3 is set in the VFB 4, and the communication processing part 12 is logically connected with this communication bus 11.

Using this communication bus 11, the communication processing part 12 receives data transmitted from the middleware 3, and stores the received data in the buffer part 13.

The communication processing part 12 also receives as input from the buffer part 13 data to the middleware 3, and transmits the data received as input to the middleware 3 using the communication bus 11 in the VFB 4.

The API processing part 14 allows the APP module 9 to access the buffer part 13.

That is, the API processing part 14 receives as input from the APP module 9 data to the existing APP SW-C(1) 5, and stores the data received as input in the buffer part 13.

The API processing part 14 also receives as input from the buffer part 13 data from the existing APP SW-C(1) 5, and outputs the data received as input to the APP module 9.

The API processing part 14 also receives as input from the APP module 9 data to the middleware 3, and stores the data received as input in the buffer part 13.

The API processing part 14 also receives as input from the buffer part 13 data from the middleware 3, and outputs the data received as input to the APP module 9.

The API processing part 14 corresponds to an example of a data relay part.

By implementing the ASL 10 configured as described above on the ECU 100 before the ECU 100 is shipped from the factory, for example, the APP module 9 can be added to the ECU 100 without redesigning the VFB 4 after the ECU 100 is shipped from the factory.

That is, at the development phase before shipment from the factory, the communication bus 11 for communication between the APP module 9 and the existing APP SW-C(1) 5 and the communication bus 11 for communication between the APP module 9 and the middleware 3 are set in the VFB 4, and the ASL 10 is implemented on the ECU 100 by logically connecting these communication buses 11 and the communication processing part 12.

Then, when the APP module 9 is implemented on the ECU 100 after the shipment from the factory, the communication processing part 12 is already able to communicate with the existing APP SW-C(1) 5 and the middleware 3 through the VFB 4. Thus, the APP module 9 can communicate with the existing APP SW-C(1) 5 and the middleware 3 using the ASL 10 without redesigning the VFB 4.

With reference to FIG. 2, FIG. 3, and FIGS. 15 through 18, operation of the additional APP SW-C 7 will now be described.

In FIG. 2, data A1 through AN are pieces of data that are published by the existing APP SW-C(1) 5, data B1 through BN are pieces of data that are obtained by the existing APP SW-C(1) 5, data C1 and C2 are pieces of data that are published by the middleware 3, and data D1 and D2 are pieces of data that are obtained by the middleware 3.

First, it is assumed that the additional APP SW-C 7 is invoked periodically.

Figure 15:
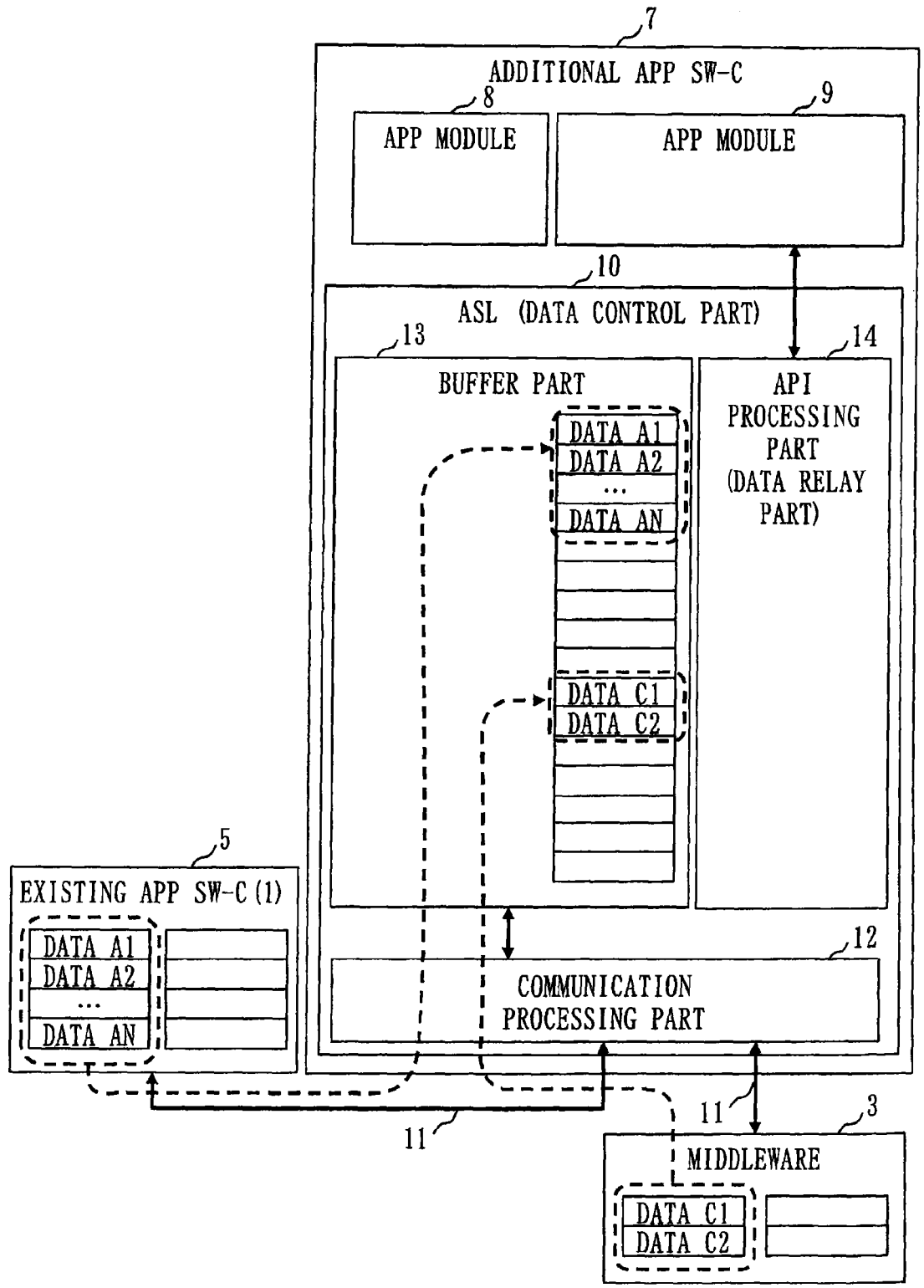
FIG. 15 is a diagram illustrating a flow of data in the ASL in the additional application SWC according to the first embodiment.

When the additional APP SW-C 7 is invoked, the communication processing part 12 of the ASL 10 obtains the published data of the existing APP SW-C(1) 5 (data A1 through AN) using the communication bus 11 of the VFB 4 (Step 1 in FIG. 3) (FIG. 15).

Figure 3:
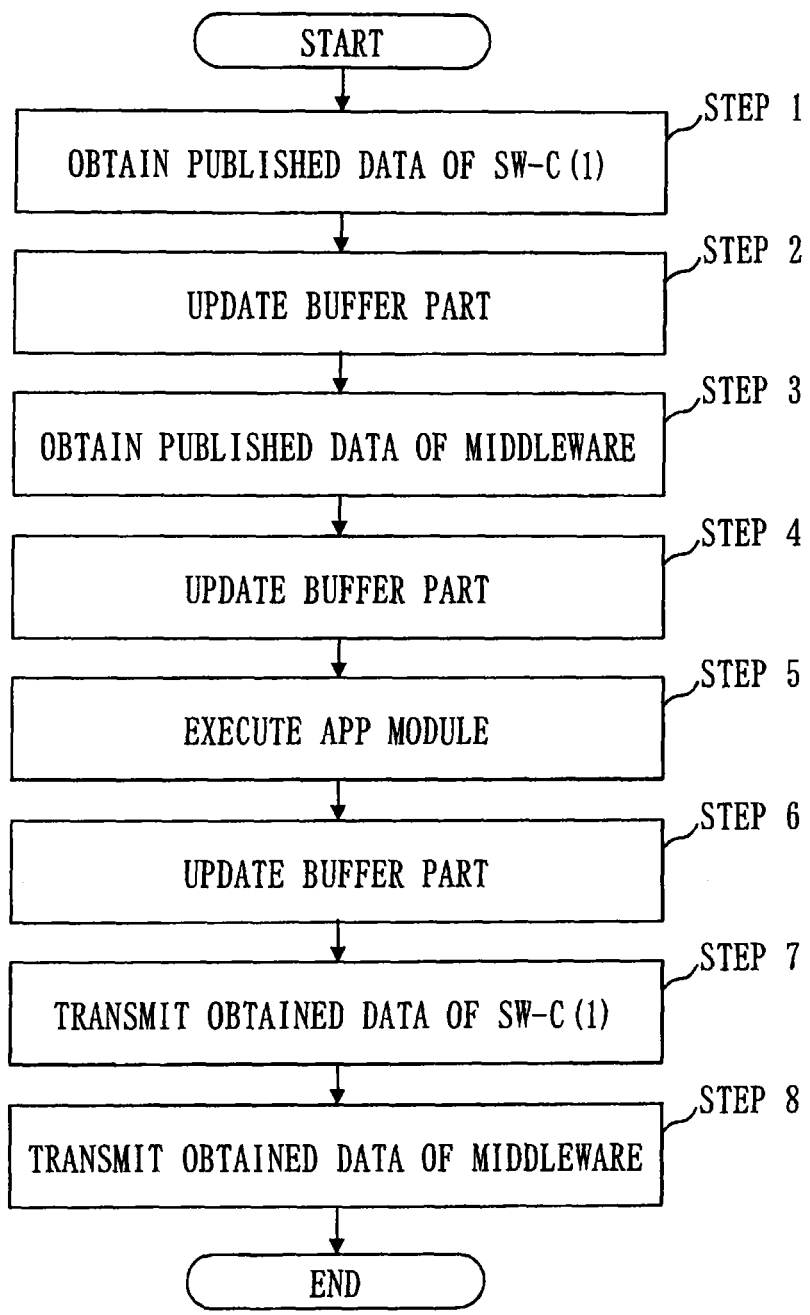
FIG. 3 is a diagram illustrating an operation flow of the additional application SW-C according to the first embodiment.

Further, the communication processing part 12 of the ASL 10 stores the published data of the existing APP SW-C(1) 5 (data A1 through AN) that has been obtained in the buffer part 13 (Step 2 in FIG. 3.) (FIG. 15).

Similarly, the communication processing part 12 of the ASL 10 obtains the published data of the middleware 3 (data C1 and C2) using the communication bus 11 of the VFB 4 (Step 3 in FIG. 3) (FIG. 15).

Further, the communication processing part 12 of the ASL 10 stores the published data of the middleware 3 (data C1 and C2) that has been obtained in the buffer part 13 (Step 4 in FIG. 3) (FIG. 15).

Then, the APP module 9 is executed (Step 5 in FIG. 3).

If the APP module 9 has not been implemented at this point, Step 5 is skipped.

If predetermined hardware has been assigned to the APP module 9 through the middleware 3, a stub module is assigned in place of the APP module 9 until the APP module 9 is implemented.

Similarly, if initial setting is required for the existing APP SW-C(1) 5 which is to operate in conjunction with the APP module 9, a stub module is assigned in place of the APP module 9 until the APP module 9 is implemented.

If the stub module is assigned in place of the APP module 9, the following description should be read by replacing the APP module 9 with the stub module.

The APP module 9 uses an API provided by the API processing part 14 to read the published data of the existing APP SW-C(1) 5 (data A1 through AN).

Figure 16:
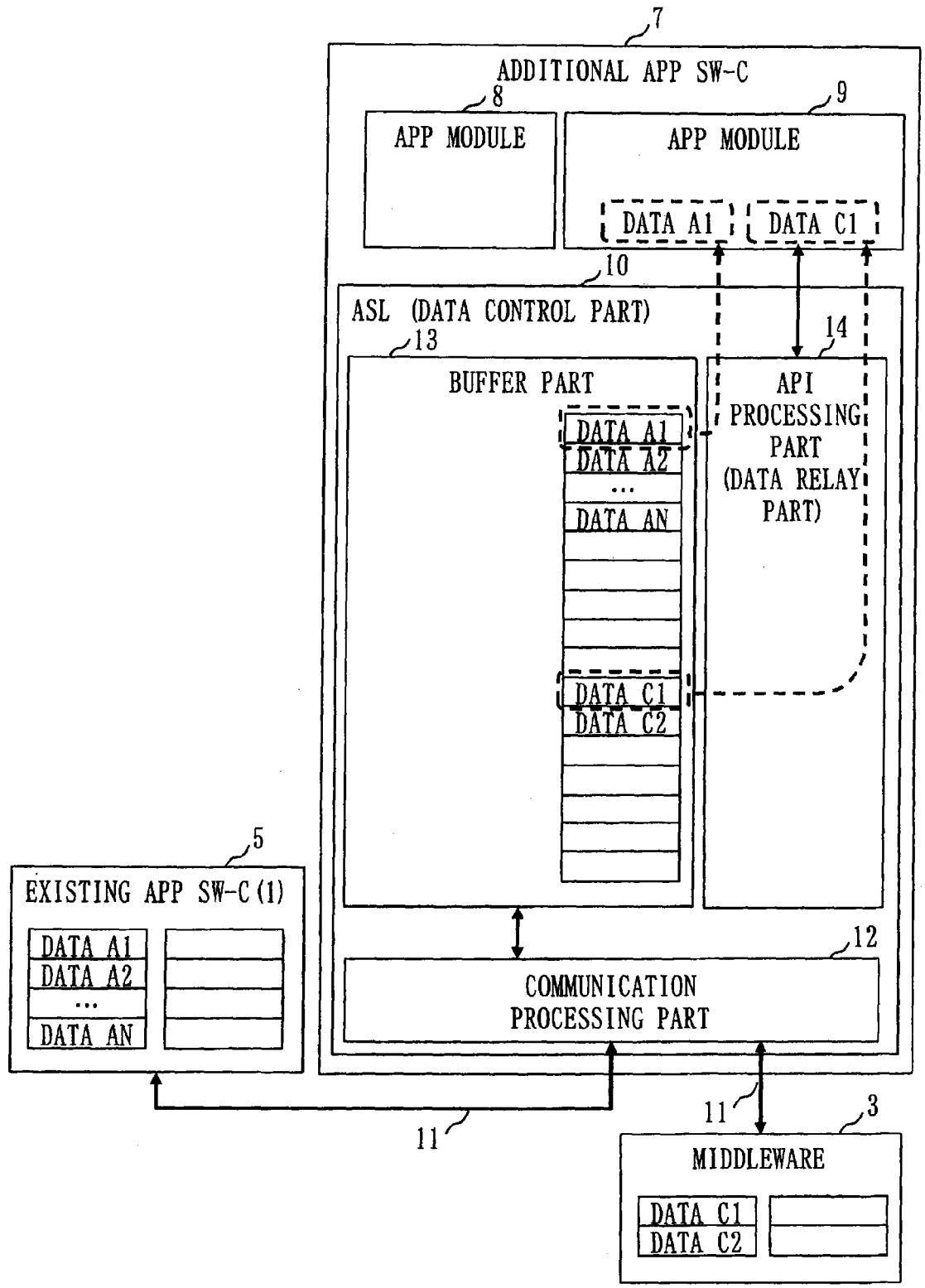
FIG. 16 is a diagram illustrating a flow of data in the ASL in the additional application SW-C according to the first embodiment.

In accordance with the content of the API, the API processing part 14 reads the published data of the existing APP SW-C(1) 5 (data A1 through AN) from the buffer part 13, and provides the data to the APP module 9 (FIG. 16).

Similarly, the API processing part 14 reads the published data of the middleware 3 (data C1 and C2) from the buffer part 13, and provides the data to the APP module 9 (FIG. 16).

The APP module 9 uses the API provided by the API processing part 14 also to transmit the obtained data of the existing APP SW-C(1) 5 (data B1 through BN) to the existing APP SW-C(1) 5.

Figure 17:
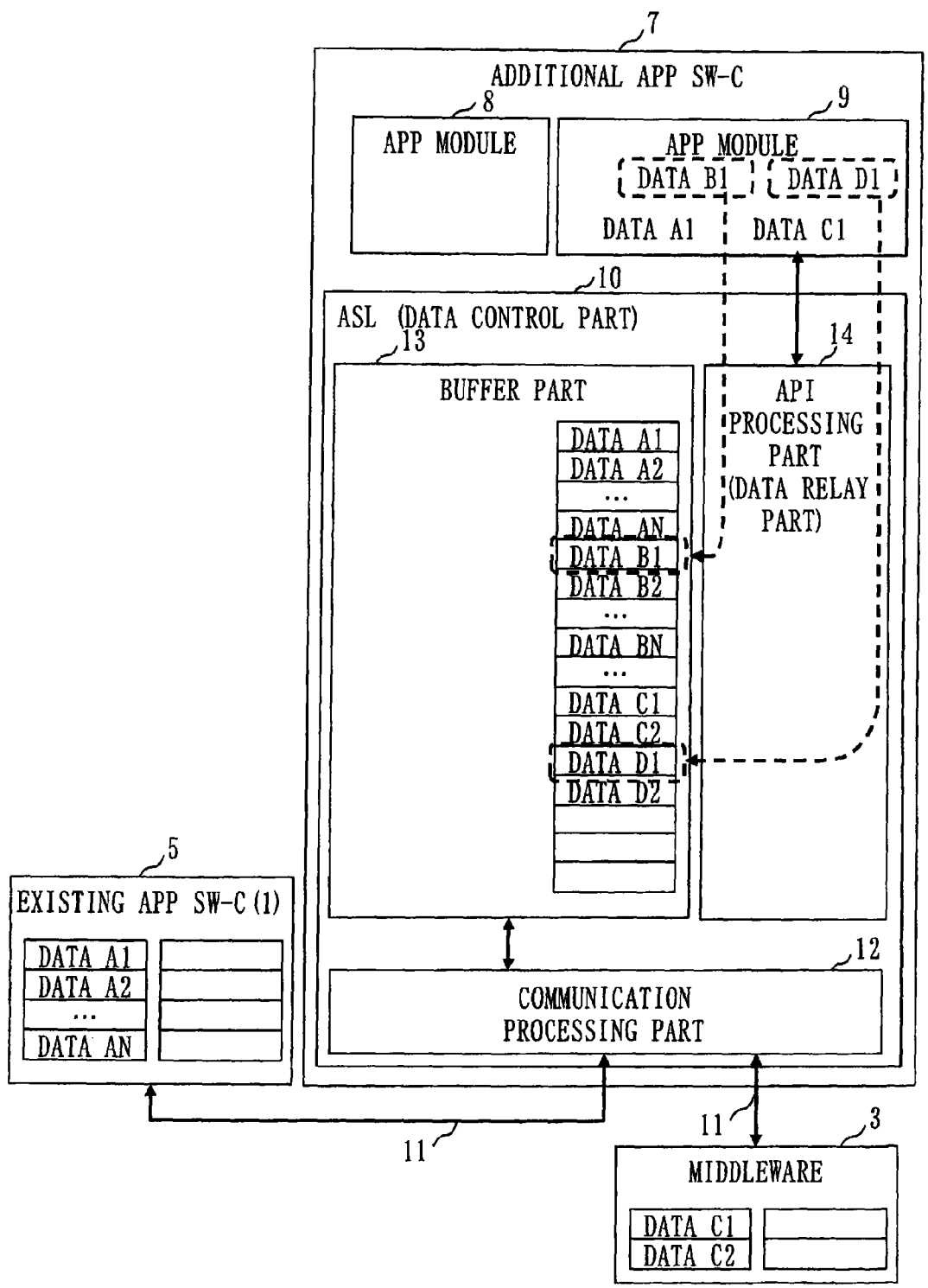
FIG. 17 is a diagram illustrating a flow of data in the ASL in the additional application SW-C according to the first embodiment.

In accordance with the content of the API called by the APP module 9, the API processing part 14 writes the obtained data of the existing APP SW-C(1) 5 (data B1 through BN) generated by the APP module 9 to the buffer part 13 (Step 6 in FIG. 3) (FIG. 17).

Similarly, the API processing part 14 writes the obtained data of the middleware 3 (data D1 and D2) generated by the APP module 9 to the buffer part 13 (Step 6 in FIG. 3) (FIG. 17).

Figure 18:
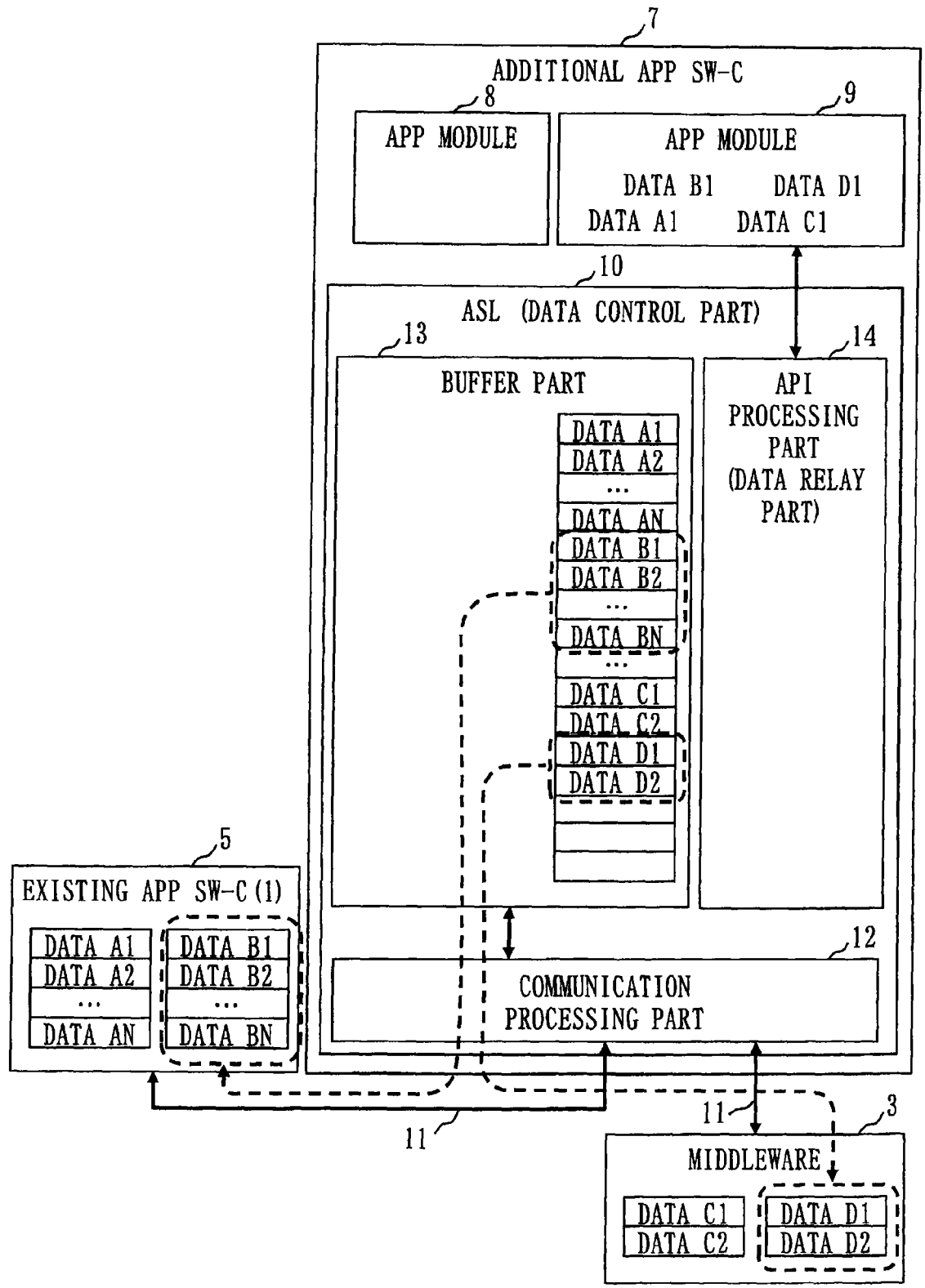
FIG. 18 is a diagram illustrating a flow of data in the ASL in the additional application SW-C according to the first embodiment.

Then, the communication processing part 12 of the ASL 10 reads the obtained data of the existing APP SW-C(1) 5 (data B1 through BN) from the buffer part 13, and transmits the data to the existing APP SW-C(1) 5 using the communication bus 11 of the VFB 4 (Step 7 in FIG. 3) (FIG. 18).

Similarly, the communication processing part 12 of the ASL 10 reads the obtained data of the middleware 3 (data D1 and D2) from the buffer part 13, and transmits the data to the middleware 3 using the communication bus 11 of the VFB 4 (Step 8 in FIG. 3) (FIG. 18).

The execution sequence of the steps illustrated in FIG. 3 may be changed.

For example, the steps may be executed in a sequence of Step 1→Step 2→Step 5→Step 6→Step 8→Step 3→Step 4→Step 5→Step 6→Step 7.

It is specified that Steps 1, 3, 7, and 8 are to be always executed regardless of the execution result of Step 5 and regardless of the value of the buffer part 13.

With the above-described operation, the processes of Steps 1, 3, 7, and 8 related to the communication buses 11 of the VFB 4 are configured to be independent of the content of Step 5.

A method for designing the communication buses 11 in the VFB 4 used by the additional APP SW-C 7 will now be described.

The communication buses 11 in the VFB 4 used by the additional APP SW-C 7 are used in the processes of Step 1, Step 3, Step 7, and Step 8 in FIG. 3.

Focusing on the communication between the additional APP SW-C 7 and the existing APP SW-Cs, the published data and the obtained data of the existing APP SW-C(1) 5 and the published data and the obtained data of the existing APP SW-C(2) 6 are transmitted and received through the communication buses 11 used by the additional APP SW-C 7.

Figure 4:
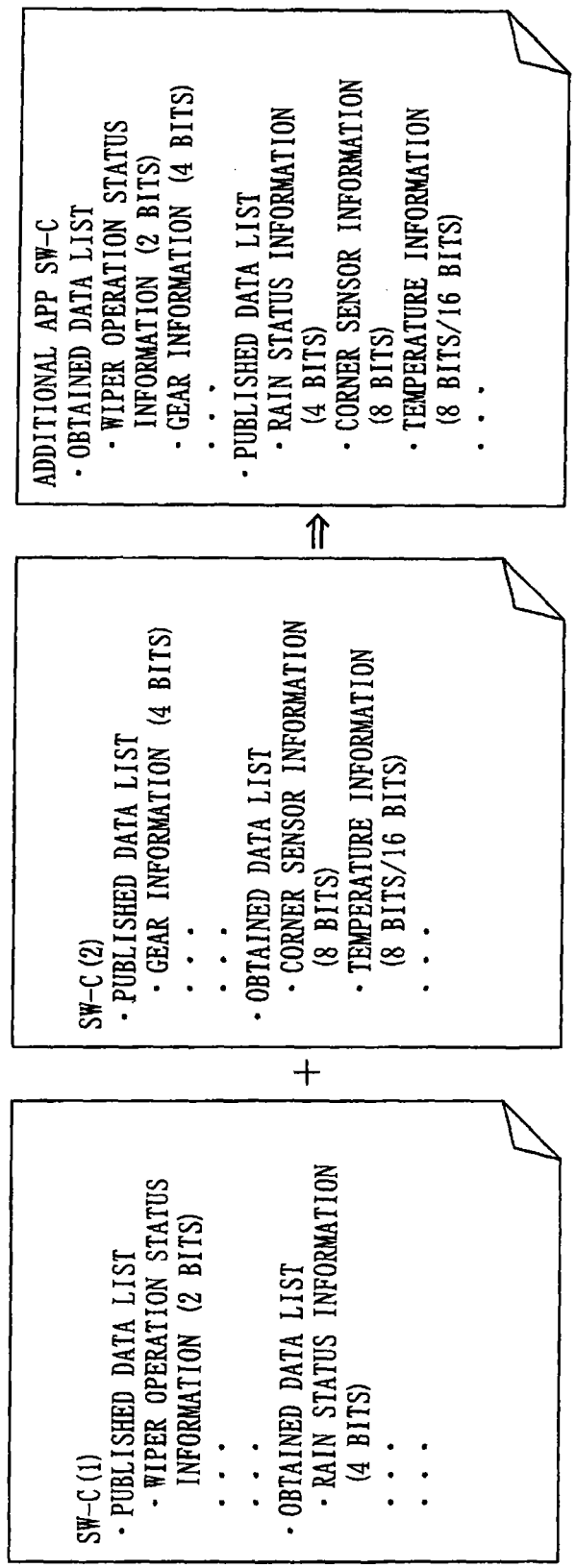
FIG. 4 is a diagram illustrating an example of components of communication buses according to the first embodiment.

FIG. 4 illustrates a specific example of the published data and the obtained data of the existing APP SW-C(1) 5 and the published data and the obtained data of the existing APP SW-C(2) 6.

The existing APP SW-C(1) 5 includes, for example, an application module that controls a wiper. The existing APP SW-C(2) 6 includes, for example, an application module that controls gears of the vehicle.

The existing APP SW-C(1) 5 transmits wiper operation status information as the published data, and receives rain status information as the obtained data.

The existing APP SW-C(2) 6 transmits gear information as the published data, and receives corner sensor information and temperature information as the obtained data.

The obtained data of the additional APP SW-C 7 is wiper operation status information and gear information. The published data of the additional APP SW-C 7 is rain status information, corner sensor information, and temperature information.

That is, the existing APP SW-C(1) 5 transmits the wiper operation status information to the additional APP SW-C 7, and the additional APP SW-C 7 transmits the rain status information to the existing APP SW-C(1) 5.

The existing APP SW-C(2) 6 transmits the gear information to the additional APP SW-C 7, and the additional APP SW-C 7 transmits the corner sensor information and the temperature information to the existing APP SW-C(2) 6.

Using combinations of these pieces of information, a designer of the VFB 4 designs the communication buses 11 used by the additional APP SWC 7.

The designer of the VFB 4 designs the VFB 4 based on the published data and the obtained data of the existing APP SW-C(1) 5, the published data and the obtained data of the existing APP SW-C(2) 6, and the published data and the obtained data of the middleware assigned to the APP modules 8 and 9 to be added.

Therefore, only the ASL 10 needs to be included in the additional APP SW-C 7 at this point.

The APP modules 8 and 9 may be prepared concurrently at this point, or may be prepared later.

Next, using an example where the APP module 9 is added as an option to the ECU 100 as a specific example, operation of the existing APP SW-C(1) 5 and operation of the additional APP SW-C 7 will be described.

First, a method for adding the APP module 9 will be described.

Figure 14:
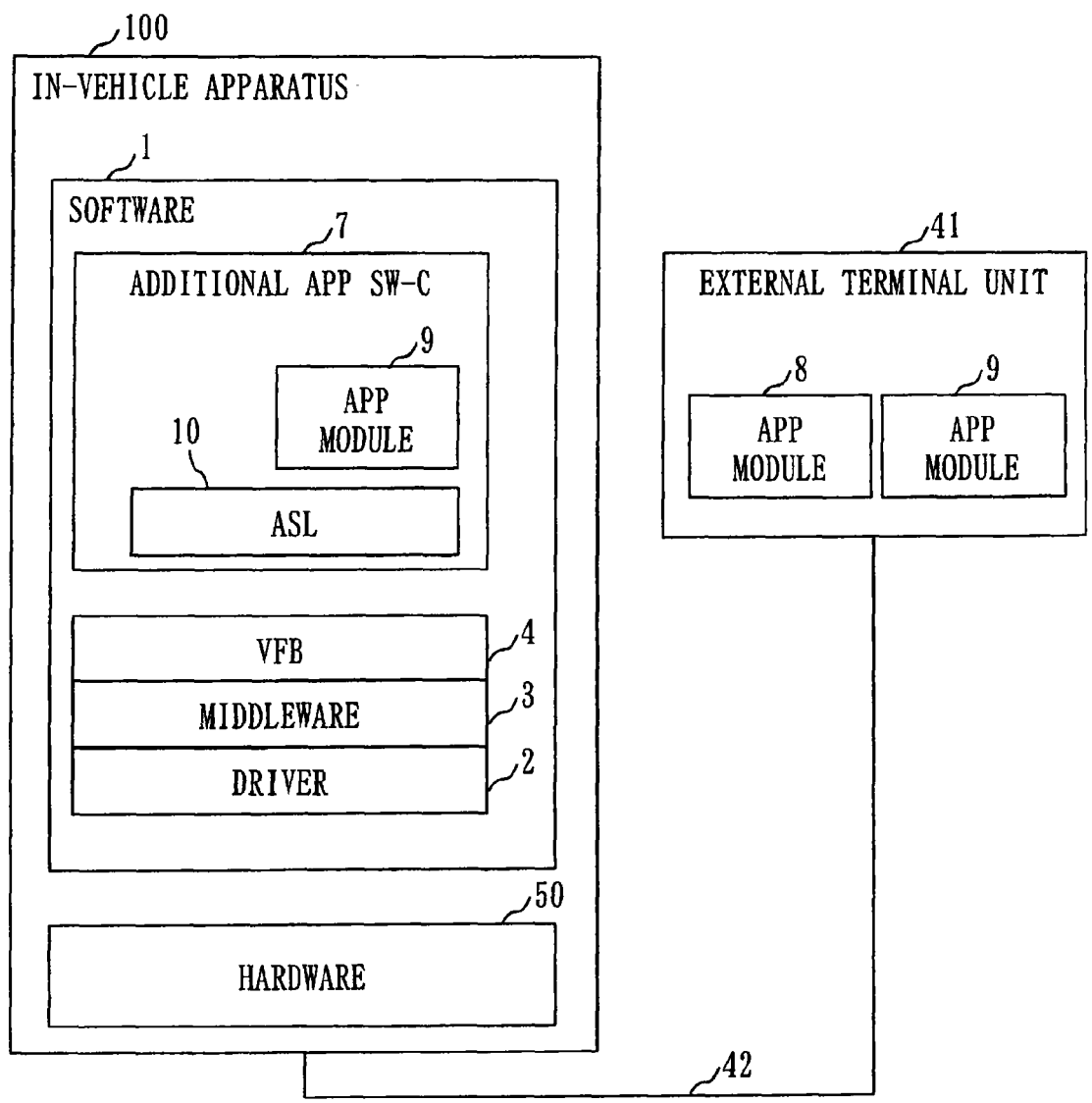
FIG. 14 is a diagram illustrating an example of a configuration when an application module is added according to the first embodiment.

The APP module 9 is stored in an external terminal unit 41 illustrated in FIG. 14.

The external terminal unit 41 is connected to the ECU 100 through a communication means 42 such as a CAN (Controller Area Network), for example.

Although the illustration of some parts is omitted in FIG. 14, the software 1 and the hardware 50 of FIG. 14 are the software 1 and the hardware 50 illustrated in FIG. 1.

Through the communication module 502 in the hardware 50 of the ECU 100, the software 1 can communicate with equipment connected to the communication means 42.

In the configuration as described above, the APP module 9 is added on to the additional APP SWC 7 from the external terminal unit 41.

Next, operation after the APP module 9 is added on to the additional APP SW-C 7 will be described.

The following description is provided using an example where the existing APP SW-C(1) 5 is a wiper control application module.

The existing APP SW-C(1) 5 operates the wiper in one of High mode (also referred to as Hi mode), Low mode, and Intermittent mode.

In Hi mode, the existing APP SW-C(1) 5 operates the wiper continuously at high speed.

In Low mode, the existing APP SW-C(1) 5 operates the wiper continuously at low speed.

In Intermittent mode, the existing APP SW-C(1) 5 operates the wiper intermittently at regular intervals.

The ECU 100 allows a raindrop detection device to be attached as an option.

When the raindrop detection device is attached, a raindrop detection device control application is added concurrently as the APP module 9.

The raindrop detection device control application (APP module 9) calculates a rain status according to a sensor value detected by the raindrop detection device.

The raindrop detection device control application (APP module 9) obtains the sensor value of the raindrop detection device from the middleware 3, and calculates the rain status.

When the raindrop detection device is attached, the existing APP SW-C(1) 5 changes the operation cycle of the wiper in Intermittent mode according to the rain status calculated by the raindrop detection device control application (APP module 9).

Figure 5:
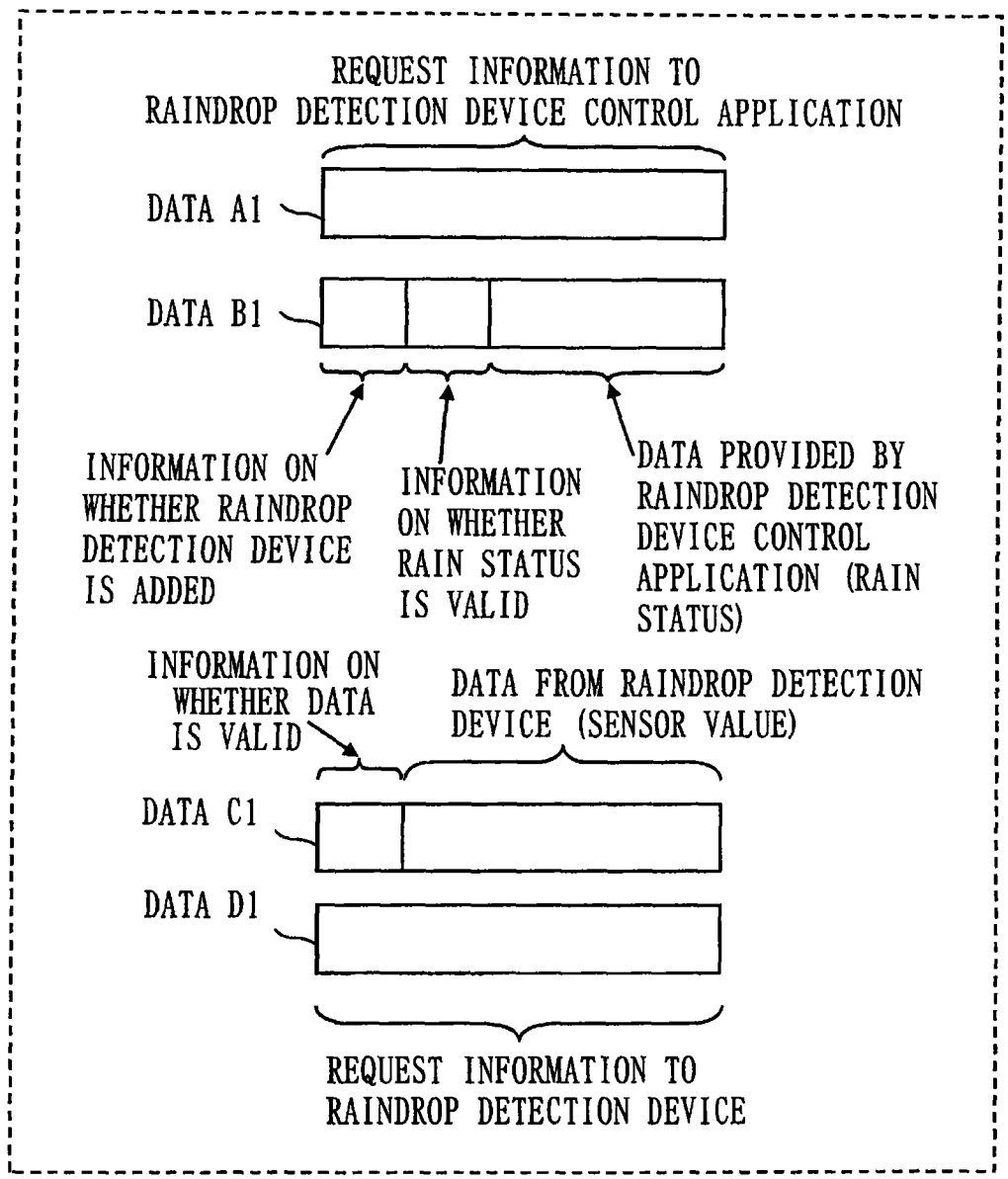
FIG. 5 is a diagram illustrating an example of allocation of data according to the first embodiment.

As illustrated in FIG. 5, in this example, as data A1 (corresponding to the data A1 in FIG. 2), request information to the raindrop detection device control application is transmitted from the existing APP SW-C(1) 5 to the additional APP SW-C 7.

As data B1 (corresponding to the data B1 in FIG. 2), information on whether the raindrop detection device is added, information on whether the rain status is valid, and the data (rain status) provided by the raindrop detection device control application are transmitted from the additional APP SW-C 7 to the existing APP SW-C(1) 5.

As data C1 (corresponding to the data C1 in FIG. 2), information on whether the data is valid and the data (sensor value) from the raindrop detection device are transmitted from the middleware 3 to the additional APP SW-C 7.

As data D1 (corresponding to the data D1 in FIG. 2), request information to the raindrop detection device is transmitted from the additional APP SW-C 7 to the middleware 3.

Figure 6:
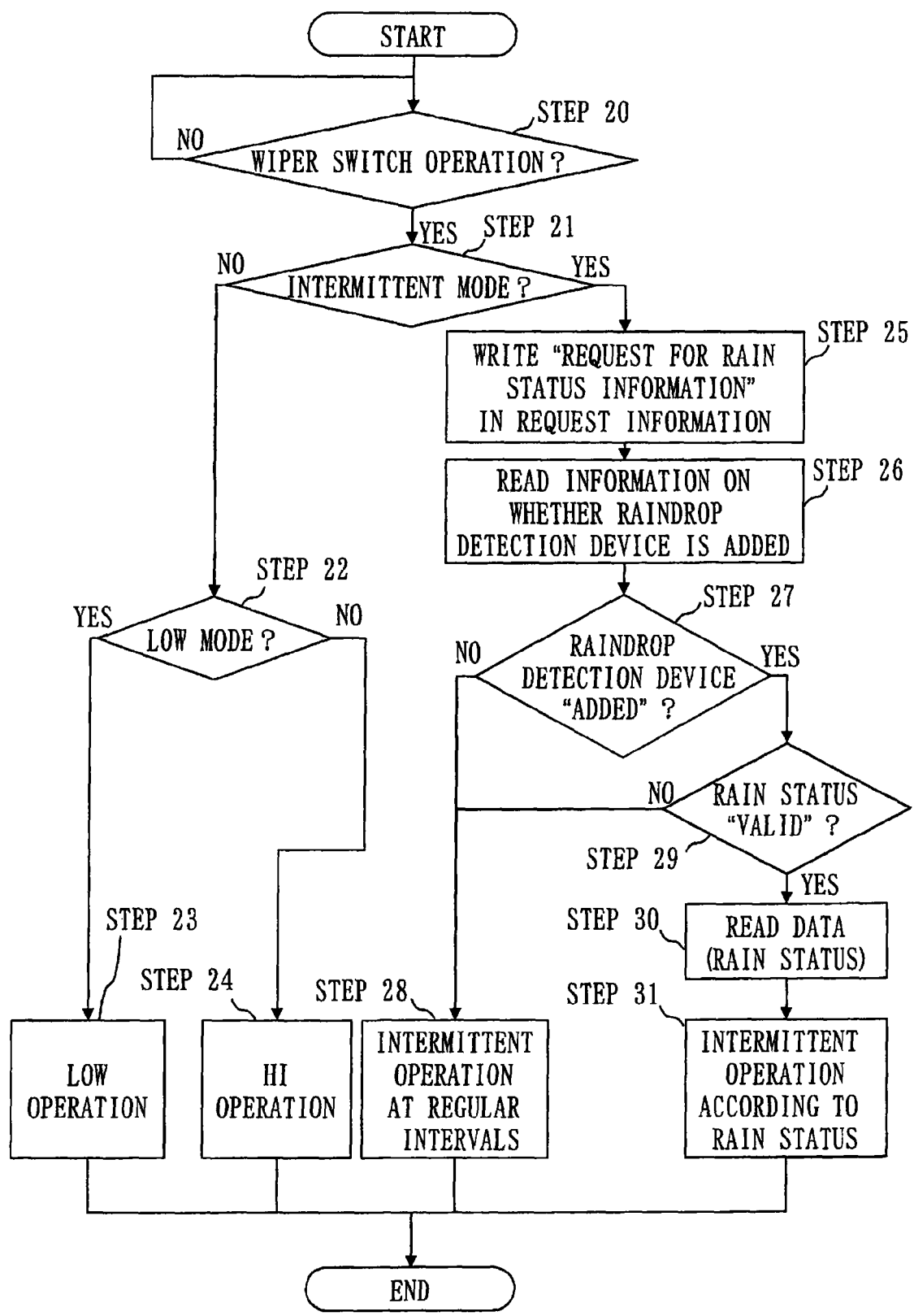
FIG. 6 is a diagram illustrating an operation flow of an existing application SW-C according to the first embodiment.

FIG. 6 illustrates an example of operation of the existing APP SW-C(1) 5.

Upon being invoked, the existing APP SW-C(1) 5 checks whether a wiper switch operation has been performed by the user of the vehicle (Step 20).

If a wiper switch operation has been performed (YES in Step 20), the existing APP SW-C(1) 5 checks whether the mode selected by the user is Intermittent mode (Step 21).

If the mode selected by the user is not Intermittent mode (NO in Step 21), the existing APP SW-C(1) 5 checks whether the mode selected by the user is Low mode (Step 22).

If the mode selected by the user is Low mode (YES in Step 22), the existing APP SW-C(1) 5 operates the wiper in Low mode (Step 23).

If the mode selected by the user is not Low mode (NO in Step 22), the existing APP SW-C(1) 5 operates the wiper in Hi mode (Step 24).

If the mode selected by the user is Intermittent mode (YES in Step 21), the existing APP SW-C(1) 5 writes "request for rain status information" in the request information to the raindrop detection device control application which is the data A1 (Step 25).

Then, the existing APP SW-C(1) 5 transmits the request information to the raindrop detection device control application (data A1) to the additional APP SW-C 7 through the appropriate communication bus 11 in the VFB 4.

Then, the existing APP SW-C(1) 5 receives the data B1, and reads the information on whether the raindrop detection device is added in the data B1 (Step 26).

The information on whether the raindrop detection device is added is information which is transmitted from the additional APP SWC 7.

If the raindrop detection device is not attached to the ECU 100, then the APP module 9 is also not implemented. Therefore, the stub module for the APP module 9 writes "not added" in the information on whether the raindrop detection device is added in the data B1.

The existing APP SW-C(1) 5 analyzes the information on whether the raindrop detection device is added in the data B1 to check whether the raindrop detection device is attached to the ECU 100 (Step 27).

If the raindrop detection device is not attached to the ECU 100 (NO in Step 27), the existing APP SW-C(1) 5 operates the wiper intermittently at regular intervals (Step 28).

If the raindrop detection device is attached to the ECU 100 (YES in Step 27), the existing APP SW-C(1) 5 checks whether the information on whether the rain status is valid in the data B1 is "valid" (Step 29).

If the information on whether the rain status is valid in the data B1 is "valid" (YES in Step 29), the existing APP SW-C(1) 5 reads a "rain status" value from the data (rain status) provided by the raindrop detection device control application in the data B1 (Step 30), and operates the wiper intermittently at intervals according to the "rain status" value (Step 31).

For example, the "rain status" value may be specified in three levels, namely "heavy", "moderate", and "light", and the existing APP SW-C(1) 5 may adjust the operation cycle of the wiper according to each level.

Figure 7:
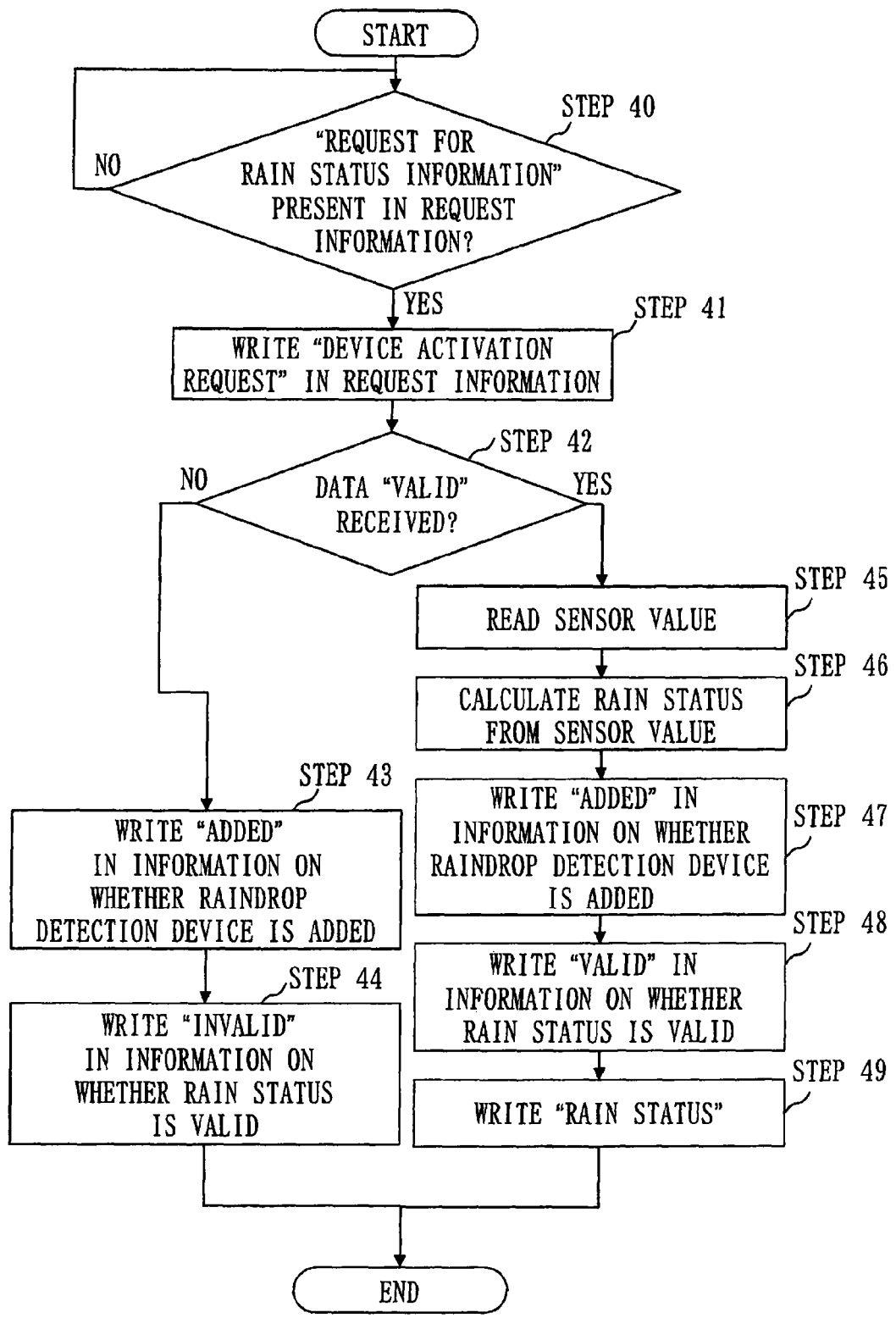
FIG. 7 is a diagram illustrating an operation flow of an application module according to the first embodiment.

FIG. 7 illustrates an example of operation of the additional APP SW-C 7 including the APP module 9 which is the raindrop detection device control application.

First, the communication processing part 12 of the ASL 10 receives the data A1 from the existing APP SW-C(1) 5 through the communication bus 11 of the VFB 4.

Then, the data A1 is routed through the buffer part 13 and the API processing part 14 and is input to the APP module 9.

The APP module 9 analyzes the request information to the raindrop detection device control application in the data A1 to check whether "request for rain status information" is present in the request information to the raindrop detection device control application (data A1) (Step 40).

If "request for rain status information" is present in the request information to the raindrop detection device control application (YES in Step 40), the APP module 9 writes "device activation request" in the request information to the raindrop detection device which is the data D1 (Step 41).

Then, the APP module 9 outputs the request information to the raindrop detection device (data D1) to the API processing part 14, and the request information to the raindrop detection device (data D1) is routed through the buffer part 13 and is transmitted from the communication processing part 12 to the middleware 3 through the VFB 4.

The processes up to here correspond to Step 1, Step 2, Step 5, Step 6, and Step 8 in FIG. 3.

Then, the communication processing part 12 receives the data C1 from the middleware 3 through the VFB 4, and stores the data C1 in the buffer part 13.

Then, the API processing part 14 reads the data C1 from the buffer part 13, and outputs the data C1 that has been read to the APP module 9.

The APP module 9 checks the information on whether the data is valid in the data C1 (Step 42).

If the information on whether the data is valid in the data C1 is "invalid" (NO in Step 42), the APP module 9 writes "added" in the information on whether the raindrop detection device is added in the data B1 (Step 43).

Further, the APP module 9 writes "invalid" in the information on whether the rain status is valid in the data B1 (Step 44).

No information is written in the data (rain status) provided by the raindrop detection device control application in the data B1.

Then, the data B1 is output from the APP module 9 to the API processing part 14. The data B1 is routed through the API processing part 14 and the buffer part 13, and is transmitted from the communication processing part 12 to the existing APP SW-C(1) 5 through the VFB 4.

The processes up to here correspond to Step 3, Step 4, Step 5, Step 6, and Step 8 in FIG. 3.

On the other hand, as a result of checking the information on whether the data is valid in the data C1, if the information on whether the data is valid is "valid" (YES in Step 42), the APP module 9 reads the sensor value from the data (sensor value) from the raindrop detection device in the data C1 (Step 45), and calculates the rain status based on the sensor value that has been read (Step 46).

Then, the APP module 9 writes "added" in the information on whether the raindrop detection device is added in the data B1 (Step 47).

The APP module 9 also writes "valid" in the information on whether the rain status is valid in the data B1 (Step 48).

Further, the APP module 9 writes the "rain status" calculated in Step 46 in the data (rain status) provided by the raindrop detection device control application in the data B1 (Step 49).

Then, the data B1 is output from the APP module 9 to the API processing part 14. The data B1 is routed through the API processing part 14 and the buffer part 13 and is output from the communication processing part 12 to the existing APP SW-C(1) 5 through the VFB 4.

The processes up to here correspond to Step 3, Step 4, Step 5, Step 6, and Step 8 in FIG. 3.

In the existing APP SW-C(1) 5, the operation at Step 26 and onward in FIG. 6 is performed.

As described above, in this embodiment, the communication bus 11 for communication between the APP module 9 and the existing APP SW-C(1) 5 and the communication bus 11 for communication between the APP module 9 and the middleware 3 are set in the VFB 4 before the APP module 9 is implemented, and the ASL 10 is implemented on the ECU 100 by logically connecting these communication buses 11 and the communication processing part 12.

Then, when the APP module 9 is implemented on the ECU 100, the communication processing part 12 is already able to communicate with the existing APP SW-C(1) 5 and the middleware 3 through the VFB 4. Thus, the APP module 9 can communicate with the existing APP SW-C(1) 5 and the middleware 3 using the ASL 10 without redesigning the VFB 4.

That is, according to this embodiment, the ASL 10 is provided between the APP module 9 and the existing APP SW-C(1) 5, thereby allowing the APP module 9 to be added without changing the VFB 4.

For this reason, once the VFB 4 is designed while the ECU 100 is being developed, there is no need to redesign the VFB 4 when an SW-C is to be added.

Further, since the VFB design tool is not required for adding an SW-C, the software can be easily updated while the ECU 100 is in operation in the actual field away from the development environment.

In this embodiment,
an in-vehicle apparatus has been described wherein an additional application SW-C is implemented separately from an existing application SWC as a software architecture.

Then, it has been described that the additional application SW-C is configured such that an application module to be added is placed at an upper layer and an ASL is placed at a lower layer.

Further, it has been described that the ASL has a communication processing part that communicates with another SW-C and middleware through a VFB, a buffer part for storing information obtained by the communication processing part from the other SW-C and the middleware and information to be transmitted to the other SW-C and the middleware, and an API processing part that allows the application module to access the buffer part.

Second Embodiment

Figure 8:
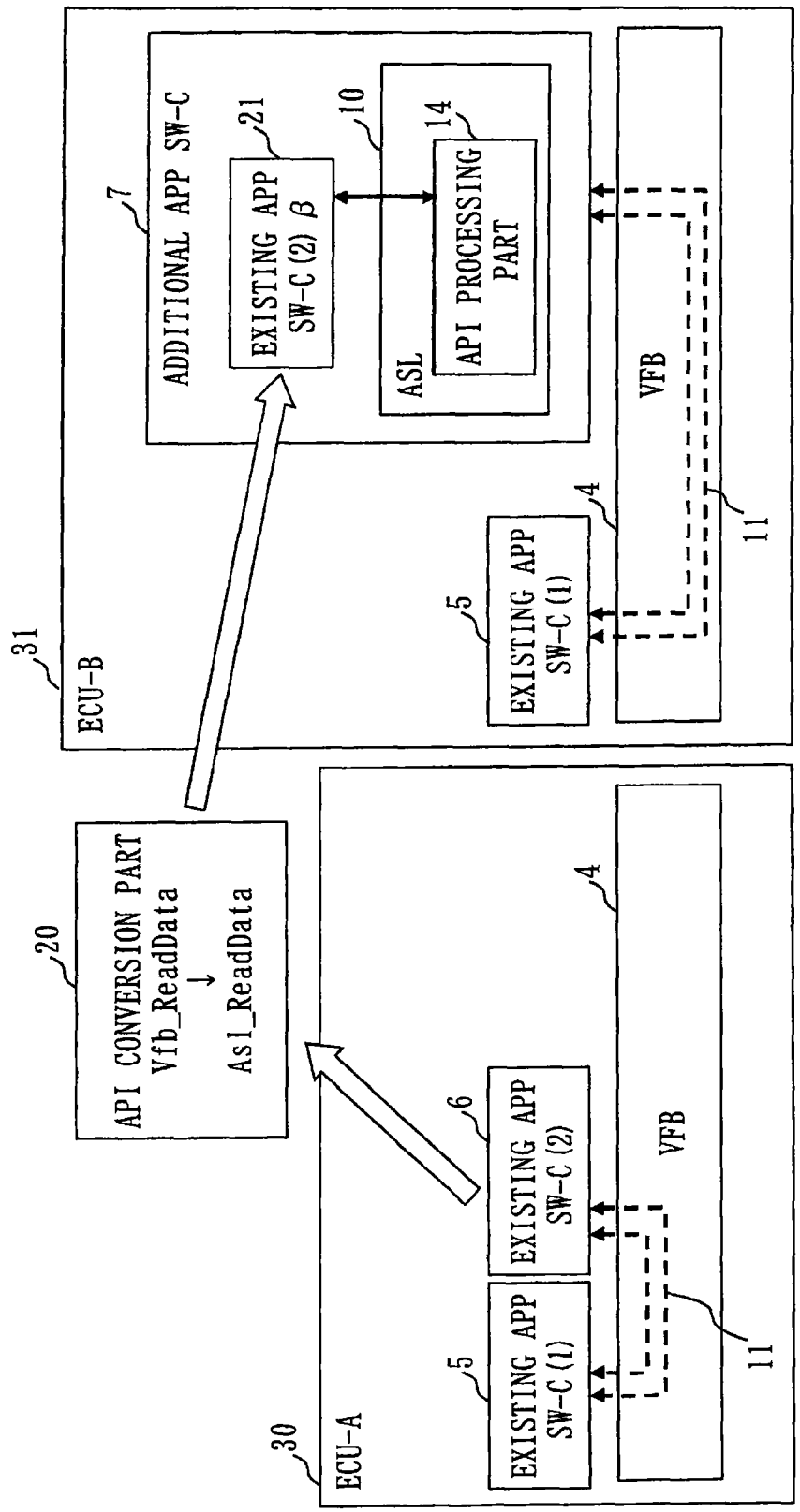
FIG. 8 is a diagram illustrating an example of API conversion outside the ECU according to a second embodiment.

FIG. 8 describes operation in which the existing APP SW-C(2) 6 being used in an ECU-A30 is ported to an ECU-B31.

In the ECU-A30, two SW-Cs, namely the existing APP SW-C(1) 5 and the existing APP SW-C(2) 6, are implemented and the two SW-Cs communicate with each other through the VFB 4.

In the ECU-B31, two SW-Cs, namely the existing APP SW-C(1) 5 and the additional APP SW-C 7, are implemented and the two SW-Cs communicate with each other through the VFB 4.

As described in the first embodiment, the ASL 10 of the additional APP SW-C 7 is logically connected with the communication bus 11 used for communication with the existing APP SW-C(1) 5.

Since the VFB 4 of the ECU-B31 does not include the communication bus 11 for communication between the ASL 10 of the additional APP SW-C 7 and the existing APP SW-C(2) 6, the existing APP SW-C(2) 6 cannot be directly implemented on the VFB 4 of the ECU-B31.

Thus, the existing APP SW-C(2) 6 is implemented as an application module of the additional APP SW-C 7.

If an API used by the existing APP SW-C(2) 6 is different from an API provided by the API processing part 14, an API conversion part 20 for absorbing differences in the APIs is provided.

For example, assume that the existing APP SW-C(2) 6 uses an API called Vfb_ReadData for reading data.

Assume that the API processing part 14 provides an API called Asl_ReadData to the application module for reading data.

In this case, the API conversion part 20 changes a description of Vfb_ReadData in the source code of the existing APP SW-C(2) 6 to Asl_ReadData, and generates an existing APP SW-C(2) β21 supporting Asl_ReadData.

The API conversion part 20 changes only the name of the API in the source code, and the control logic of the existing APP SW-C(2) β21 is the same as that of the APP SW-C(2) 6.

With this arrangement, the ECU-B31 can implement the existing APP SW-C(2) 6 as an application module of the additional APP SW-C 7 without changing the VFB 4 and without changing the logic of the existing APP SW-C(2) 6.

The API may be changed in the in-vehicle apparatus.

Figure 9:
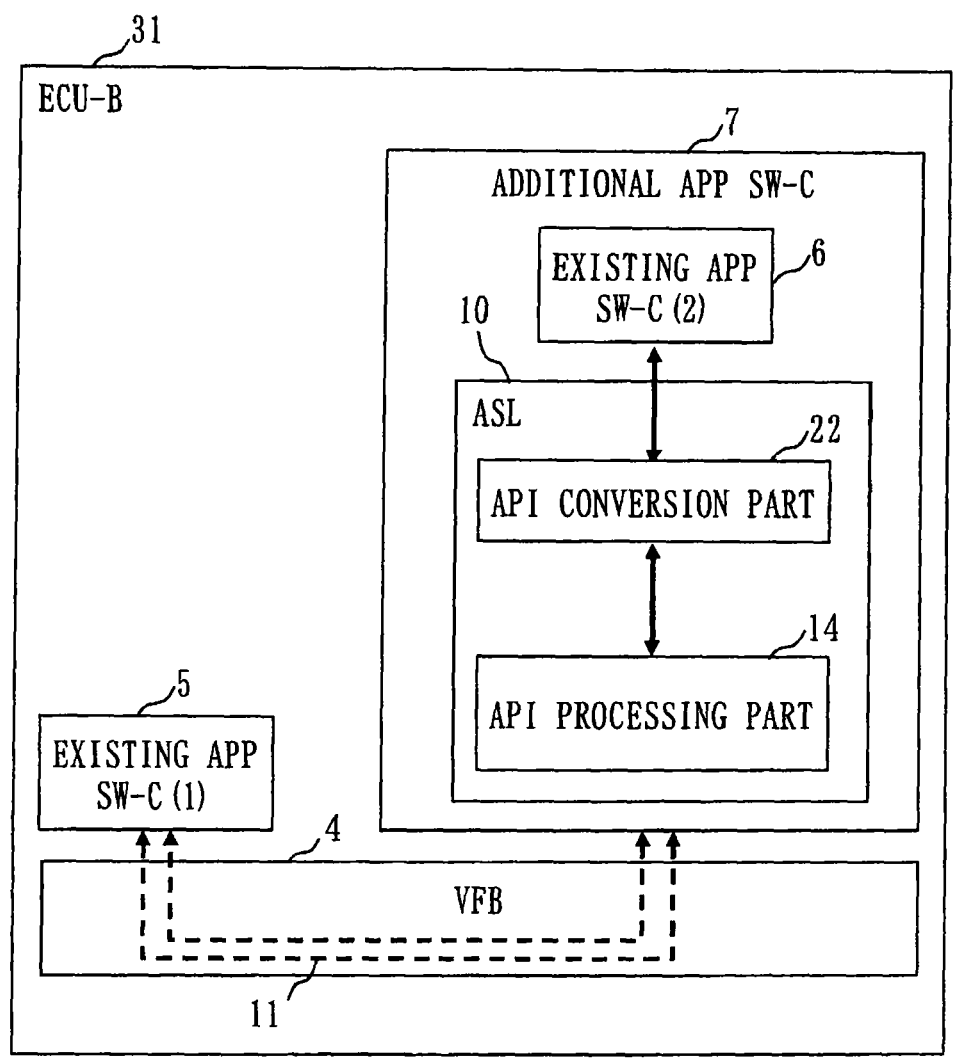
FIG. 9 is a diagram illustrating an example of API conversion inside the ECU according to the second embodiment.

FIG. 9 illustrates a configuration in which an API conversion part 22 is provided in the ASL 10.

The ECU-B31 of FIG. 9 is the ECU 100 of FIG. 1.

In FIG. 9, the illustration of the hardware 50 and the illustration of the communication processing part 12, the buffer part 13, and the APP modules 8 and 9 in the additional APP SW-C 7 are omitted.

In the API conversion part 22, the API used by the existing APP SW-C(2) 6 is prepared.

The API conversion part 22 receives as input data from the existing APP SW-C(2) 6 using the API used by the existing APP SW-C(2) 6, and outputs the data received as input to the API processing part 14 using the API used by the API processing part 14.

The API conversion part 22 receives as input data from the API processing part 14 using the API used by the API processing part 14, and outputs the data received as input to the existing APP SW-C(2) 6 using the API used by the existing APP SW-C(2) 6.

The API conversion part 22 may redefine the API used by the existing APP SW-C(2) 6 to input and output data as the API used by the API processing part 14 to input and output data, or may directly call the API of the API processing part 14.

The existing APP SW-C(2) 6 that is implemented on the additional APP SW-C 7 corresponds to an example of a specified software component.

Except for the API conversion operation by the API conversion part 22, the procedure for communication between the existing APP SW-C(1) 5 and the existing APP SW-C(2) 6 in FIG. 9 is the same as the procedure for communication between the existing APP SW-C(1) 5 and the APP module 9 described in the first embodiment.

That is, the communication processing part 12 receives data from the existing APP SW-C(1) 5 through the appropriate communication bus 11 of the VFB 4, and stores the received data in the buffer part 13. The API processing part 14 receives as input from the buffer part 13 the data from the existing APP SW-C(1) 5, and outputs the data received as input to the existing APP SW-C(2) 6 through the API conversion part 22.

The API processing part 14 receives as input data from the existing APP SW-C(2) 6 through the API conversion part 22, and stores the data received as input in the buffer part 13. The communication processing part 12 receives as input from the buffer part 13 the data from the existing APP SW-C(2) 6, and transmits the data received as input to the existing APP SW-C(1) 5 through the appropriate communication bus 11 of the VFB 4.

Third Embodiment

The communication buses 11 of the VFB 4 can be provided with future expandability without changing the VFB 4.

The VFB 4 described in the first embodiment is provided with the communication bus 11 for communication of the defined published data and obtained data between an APP module and the existing APP SW-C(1) 5 and the communication bus 11 for communication of the published data and obtained data between an APP module and the existing APP SW-C(2) 6.

The above published data and obtained data are defined in the design phase of the VFB 4, and the communication buses 11 described in the first embodiment will hereinafter be referred to as defined buses.

In this embodiment, a spare communication bus 11 is provided for which data to be communicated is not defined in the design phase of the VFB 4.

In other words, the spare communication bus 11 is a communication bus for which the content of data is not specified.

The spare communication bus 11 will hereinafter be referred to as a general-purpose bus.

Figure 10:
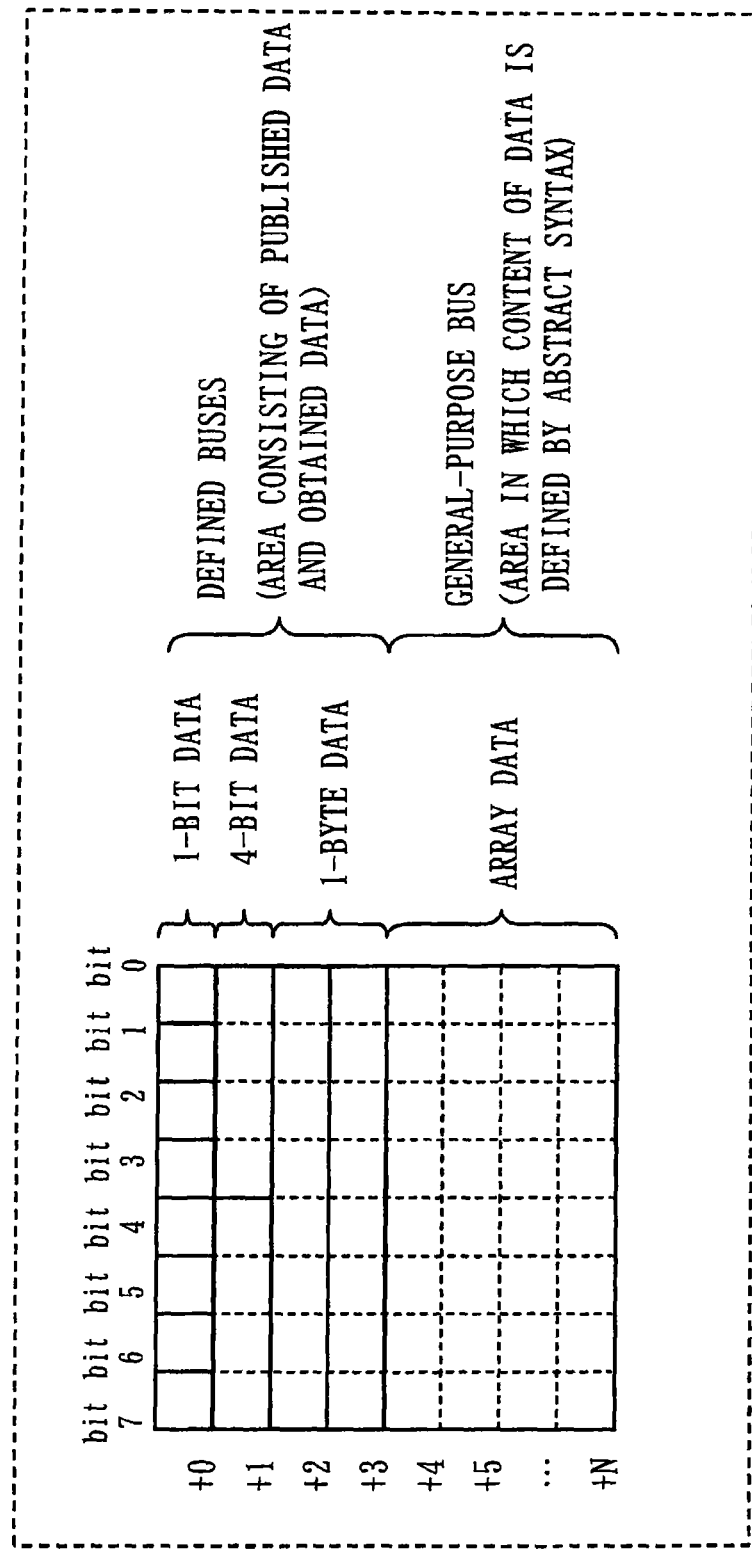
FIG. 10 is a diagram illustrating an example of frame formats of communication buses according to a third embodiment.

FIG. 10 illustrates an example of the defined buses and the general-purpose bus. For the defined buses, the published data and obtained data to be communicated are defined in advance, so that the frame format of each bus is formed according to the data type corresponding to each piece of data.

FIG. 10 illustrates the defined bus through which 1-bit data is transmitted and received, the defined bus through which 4-bit data is transmitted and received, and the defined bus through which 1-byte data is transmitted and received.

The general-purpose bus is used to transmit and receive array data of an appropriate size.

Through this general-purpose bus, data defined by an absolute syntax, such as ASN.1 or JSON, is transmitted and received. Data may also be transmitted and received by any protocol.

In an abstract syntax definition, for example, data size information describing the data size of payload data is added to the front of the payload data.

An abstract syntax definition needs to be interpreted in the same manner between communicating SW-Cs. Thus, an abstract syntax definition processing part 32 is provided in each of the existing APP SW-C(1) 5 and the additional APP SW-C 7 in this embodiment, as illustrated in FIG. 11.

Figure 11:
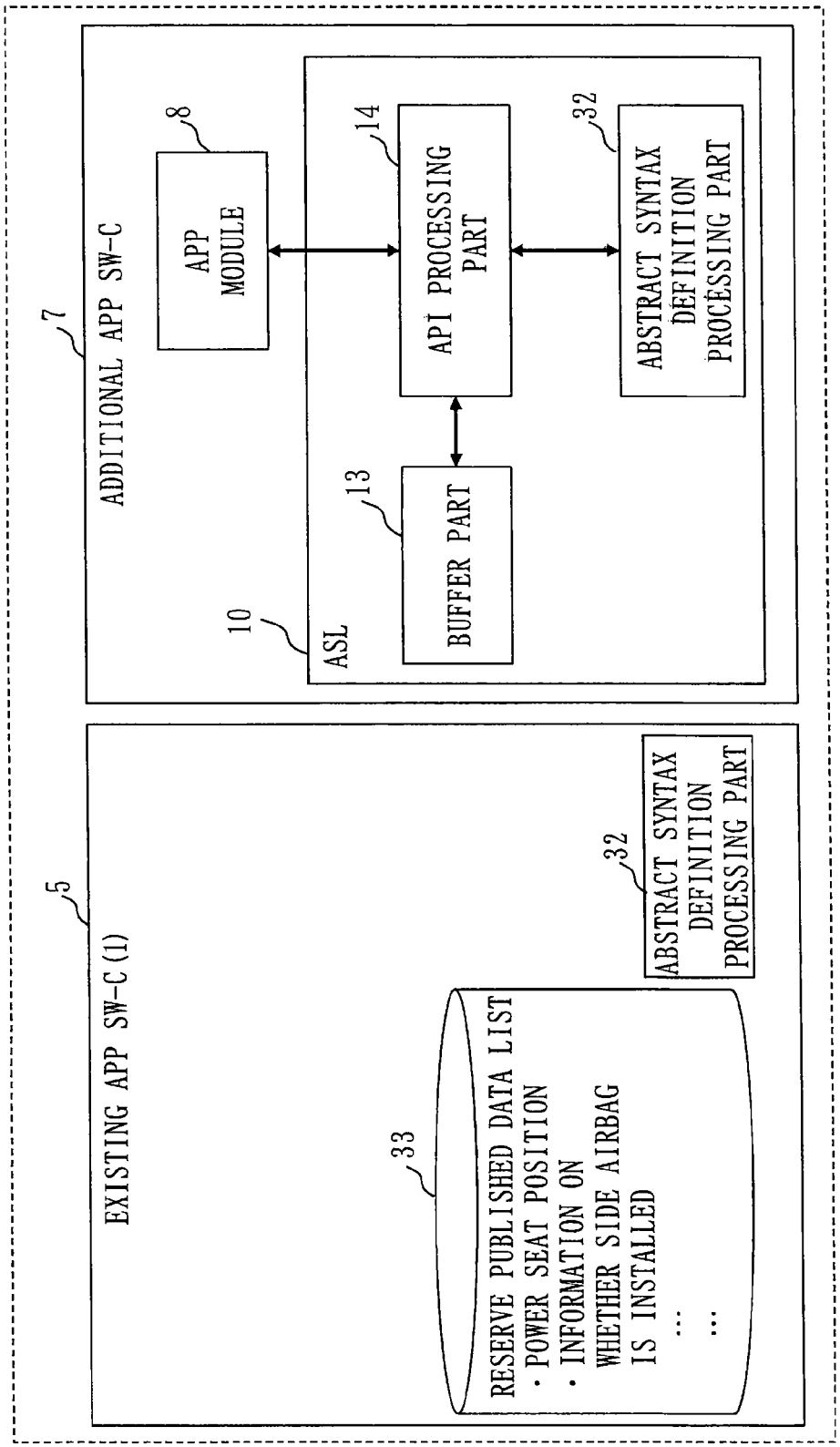
FIG. 11 is a diagram illustrating an example of internal configurations of an existing application SW-C and an additional application SW-C according to the third embodiment.

In FIG. 11, only the existing APP SW-C(1) 5 and the additional APP SW-C 7 are extracted and illustrated from the configuration of the ECU 100.

In FIG. 11, the illustration of the communication processing part 12 in the additional APP SW-C 7 is omitted.

As illustrated in FIG. 11, a reserve published data list 33 is prepared in the existing APP SW-C(1) 5.

The reserve published data list 33 is a set of data which is not used yet as published data but may be used as published data in the future.

For example, when a new application module is implemented on the ECU 100, data in the reserve published data list 33 is used as the published data of the new application module.

The reserve published data list 33 includes, for example, data such as power seat position information and information on whether a side airbag is installed.

In a design tool of the application module, the same list as the reserve published data list 33 is also provided.

Figure 12:
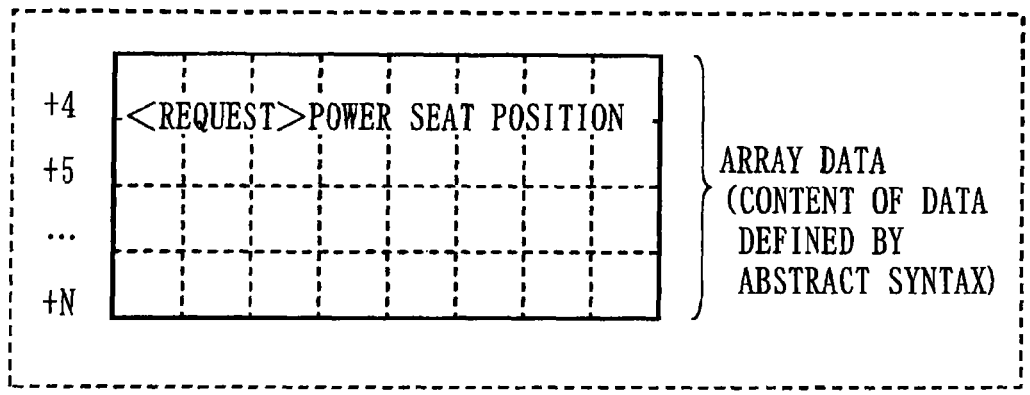
FIG. 12 is a diagram illustrating an example of data transmitted by the additional application SW-C according to the third embodiment.

FIG. 12 illustrates that using the general-purpose bus the APP module 8 transmits data to request power seat position information (information in the reserve published data list 33) held by the existing APP SW-C(1) 5.

By referring to the reserve published data list 33 in the design phase of the APP module 8, the designer can learn that the power seat position information can be obtained from the existing APP SW-C(1) 5 by using the general-purpose bus.

Based on this, the designer designs the APP module 8.

The APP module 8 that is added to the additional APP SWC 7 requests the power seat position information from the API processing part 14 using an API for requesting reserve published data.

When the API for requesting reserve published data is called, the API processing part 14 converts the data using the abstract syntax definition processing part 32 and writes the converted data at a predetermined position in the buffer part 13.

The abstract syntax definition processing part 32 performs conversion, for example, to add payload data's data size information to the payload data for requesting the power seat position information.

The communication processing part 12 receives as input from the buffer part 13 the data converted in the abstract syntax definition processing part 32, and transmits the data received as input to the general-purpose bus.

The data converted in the abstract syntax definition processing part 32 of the additional APP SWC 7 is set in the array data of the general-purpose bus.

The existing APP SW-C(1) 5 receives the data from the general-purpose bus, and converts the received data in the abstract syntax definition processing part 32 of the existing APP SW-C(1) 5 to interpret the content of the data.

The abstract syntax definition processing part 32 of the existing APP SW-C(1) 5 performs conversion, for example, to remove the data size information from the received data.

If the data requested by the APP module 8 is present in the reserve published data list 33, the existing APP SW-C(1) 5 offers a response.

Then, the abstract syntax definition processing part 32 performs conversion to add payload data's data size information to the payload data (power seat position information).

Figure 13:
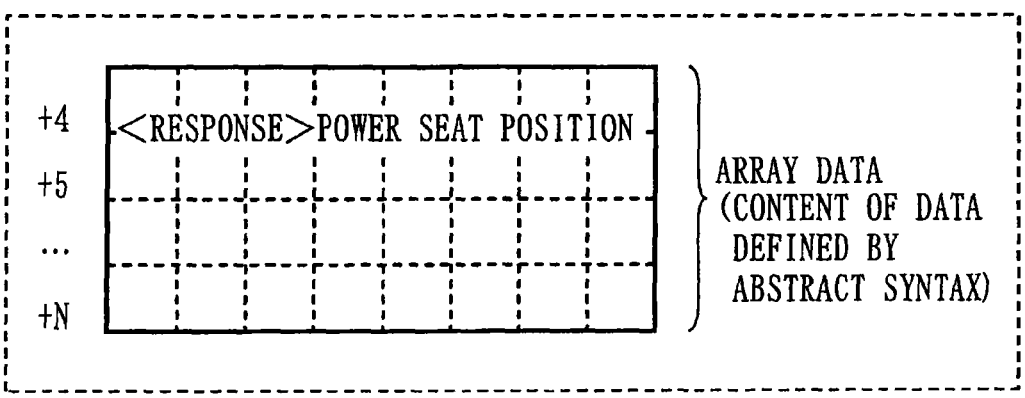
FIG. 13 is a diagram illustrating an example of data transmitted by the existing application SW-C according to the third embodiment.

FIG. 13 illustrates that the existing APP SW-C(1) 5 transmits the power seat position information using the general-purpose bus.

In the additional APP SW-C 7, the communication processing part 12 receives the data from the existing APP SW-C(1) 5 using the general-purpose bus, and the abstract syntax definition processing part 32 performs conversion to remove the data size information from the received data.

Then, the communication processing part 12 stores the converted data (power seat position information) in the buffer part 13. The API processing part 14 receives as input from the buffer part 13 the data (power seat position information), and outputs the data received as input (power seat position information) to the APP module 8.

In this embodiment, with the above-described configuration, the communication buses 11 with expandability for an application module to be introduced in the future can be realized without changing the VFB 4.

The embodiments of the present invention have been described above. Two or more of these embodiments may be implemented in combination.

Alternatively, one of these embodiments may be partially implemented.

Alternatively, two or more of these embodiments may be partially implemented in combination.

The present invention is not limited to these embodiments, and various modifications are possible as appropriate.

REFERENCE SIGNS LIST

1: software, 2: driver, 3: middleware, 4: VFB, 5: existing application SW-C(1), 6: existing application SW-C(2), 7: additional application SW-C, 8: application module, 9: application module, 10: ASL, 11: communication bus, 12: communication processing part, 13: buffer part, 14: API processing part, 20: API conversion part, 22: API conversion part, 30: ECU-A, 31: ECU-B, 32: abstract syntax definition processing part, 33: reserve published data list, 50: hardware, 100: ECU, 300: OS, 501: CPU, 502: communication module, 503: interface, 504: sensor, 505: device, 506: RAM, 507: ROM

The invention claimed is:

1. An in-vehicle apparatus on which a plurality of software components are implemented, the in-vehicle apparatus comprising:
a data control part that is associated with an application program having, as a communication target, a communication target software component out of the plurality of software components,
the data control part being an ASL (Application Sub Layer) of the application program and including
a buffer part that accumulates data to the communication target software component and data from the communication target software component, the communication target software component being the software component which is the communication target of the application program;
a communication processing part that transmits the data to the communication target software component accumulated in the buffer part to the communication target software component, receives data transmitted from the communication target software component, and stores the data received in the buffer part; and
a data relay part that receives as input the data to the communication target software component, stores the data received as input in the buffer part, receives as input from the buffer part the data from the communication target software component, and outputs the data received as input.

2. The in-vehicle apparatus according to claim 1,
wherein the data control part is associated with the application program and is implemented on the in-vehicle apparatus before the application program is implemented on the in-vehicle apparatus, and
wherein, after the application program is implemented on the in-vehicle apparatus, the data relay part receives as input from the application program the data to the communication target software component, stores the data received as input in the buffer part, and outputs to the application program the data from the communication target software component received as input from the buffer part.

3. The in-vehicle apparatus according to claim 2,
wherein, before the application program is implemented on the in-vehicle apparatus, the data relay part receives as input the data to the communication target software component from a stub module for the application program, stores the data received as input in the buffer part, and outputs to the stub module the data from the communication target software component received as input from the buffer part.

4. The in-vehicle apparatus according to claim 1,
wherein middleware is implemented on the in-vehicle apparatus,
wherein the buffer part accumulates data to the middleware and data from the middleware,
wherein the communication processing part transmits to the middleware the data to the middleware accumulated in the buffer part, receives data transmitted from the middleware, and stores the data received in the buffer part, and wherein the data relay part receives as input the data to the middleware, stores the data received as input in the buffer part, receives as input from the buffer part the data from the middleware, and outputs the data received as input.

5. The in-vehicle apparatus according to claim 4, wherein the data control part is associated with the middleware and is implemented on the in-vehicle apparatus before the application program is implemented on the in-vehicle apparatus, and wherein, after the application program is implemented on the in-vehicle apparatus, the data relay part receives as input from the application program the data to the middleware, stores the data received as input in the buffer part, and outputs to the application program the data from the middleware received as input from the buffer part.

6. The in-vehicle apparatus according to claim 5, wherein, before the application program is implemented on the in-vehicle apparatus, the data relay part receives as input from a stub module for the application program the data to the middleware, stores the data received as input in the buffer part, and outputs to the stub module the data from the middleware received as input from the buffer part.

7. The in-vehicle apparatus according to claim 1, wherein the communication processing part is connected with a communication bus which is included in a VFB (Virtual Function Bus) of AUTOSAR (registered trademark) (AUTomotive Open System ARchitecture) and which is set for communication between the communication target software component and the application program, and wherein using the communication bus the communication processing part transmits to the communication target software component the data to the communication target software component, and receives the data transmitted from the communication target software component.

8. The in-vehicle apparatus according to claim 4, wherein the communication processing part is connected with a communication bus which is included in a VFB of AUTOSAR (registered trademark) and which is set for communication between the middleware and the application program, and wherein using the communication bus the communication processing part transmits to the middleware the data to the middleware, and receives the data transmitted from the middleware.

9. The in-vehicle apparatus according to claim 1, wherein the data control part and the application program constitute the software component.

10. The in-vehicle apparatus according to claim 1, wherein the data control part is associated with a specified software component which is a software component other than the communication target software component and specified from among the plurality of software components, wherein the buffer part accumulates data from the specified software component to the communication target software component and data from the communication target software component to the specified software component, wherein the communication processing part transmits to the communication target software component the data from the specified software component accumulated in the buffer part, receives data to the specified software component transmitted from the communication target software component, and stores the data received in the buffer part, and wherein the data relay part receives as input from the specified software component the data to the communication target software component, stores the data received as input in the buffer part, receives as input from the buffer part the data to the specified software component, and outputs to the specified software component the data received as input.

11. The in-vehicle apparatus according to claim 10, further comprising an API conversion part that, when an API (Application Program Interface) used by the specified software component to input and output data is different from an API used by the data relay part to input and output data, receives as input the data from the specified software component using the API used by the specified software component, outputs the data received as input to the data relay part using the API used by the data relay part, receives as input the data from the data relay part using the API used by the data relay part, and outputs the data received as input to the specified software component using the API used by the specified software component.

12. The in-vehicle apparatus according to claim 1, wherein the communication processing part transmits to the communication target software component the data to the communication target software component and receives the data transmitted from the communication target software component, using a spare communication bus included in a VFB of AUTOSAR (registered trademark) for which data to be communicated is not defined.

13. A non-transitory computer readable medium including a computer executable program that is executed in an in-vehicle apparatus on which a plurality of software components are implemented, the program being associated with an application program having, as a communication target, a communication target software component out of the plurality of software components, the program causing an ASL (Application Sub Layer) of the application program to execute receiving as input data to the communication target software component which is the software component being the communication target of the application program, storing the data received as input in a buffer area, transmitting to the communication target software component the data to the communication target software component stored in the buffer area, receiving data transmitted from the communication target software component, storing the data received in the buffer area, and outputting the data from the communication target software component stored in the buffer area.

14. An in-vehicle apparatus on which a plurality of software components are implemented, the in-vehicle apparatus comprising a data control part that is associated with an application program having, as a communication target, a communication target software component out of the plurality of software components, the data control part being an ASL (Application Sub Layer) of the application program, intermediating communication between the application program and the plurality of software components, and including a buffer part that accumulates data to the communication target software component and data from the communication target software component, the communication target software component being the software component which is the communication target of the application program.

15. An in-vehicle apparatus on which middleware and a plurality of software components are implemented, the in-vehicle apparatus comprising a data control part that is associated with an application program having, as a communication target software component, the middleware or a software component out of the plurality of software components, the data control part being an ASL (Application Sub Layer) of the application program, intermediating communication between the application program and the middleware or between the application program and the plurality of software components, and including a buffer part that accumulates data to the communication target software component and data from the middleware or the communication target software component, the communication target software component being the software component which is the communication target of the application program.

16. An in-vehicle apparatus on which a plurality of software components are implemented, the in-vehicle apparatus comprising a data control part that is associated with an application program having the middleware as a communication target, the data control part being an ASL (Application Sub Layer) of the application program and including a buffer part that accumulates data to the middleware and data from the middleware;

a communication processing part that transmits the data to the middleware accumulated in the buffer part to the middleware, receives data transmitted from the middleware, and stores the data received in the buffer part; and a data relay part that receives as input data to the middleware, stores the data received as input in the buffer part, receives as input from the buffer part the data from the middleware, and outputs the data received as input.

* * * * *